United States Patent
Ueno et al.

(10) Patent No.: US 7,733,608 B2
(45) Date of Patent: Jun. 8, 2010

(54) HEAD HOLDING MEMBER, DISK DEVICE WITH THE HEAD HOLDING MEMBER, AND HEAD HOLDING METHOD IN THE DISK, DEVICE

(75) Inventors: Yoshihiro Ueno, Osaka (JP); Makoto Umeda, Aichi (JP)

(73) Assignee: Panasonic Corporation, Osaka (JP)

( * ) Notice: Subject to any disclaimer, the term of this patent is extended or adjusted under 35 U.S.C. 154(b) by 1092 days.

(21) Appl. No.: 10/575,456

(22) PCT Filed: Jun. 21, 2005

(86) PCT No.: PCT/JP2005/011307
§ 371 (c)(1),
(2), (4) Date: Apr. 12, 2006

(87) PCT Pub. No.: WO2005/124775
PCT Pub. Date: Dec. 29, 2005

(65) Prior Publication Data
US 2008/0247090 A1    Oct. 9, 2008

(30) Foreign Application Priority Data
Jun. 22, 2004    (JP)    ............................. 2004-183283

(51) Int. Cl.
G11B 5/54    (2006.01)
G11B 21/22    (2006.01)
(52) U.S. Cl. .................................................. 360/254.8
(58) Field of Classification Search ............... 360/254.8, 360/255, 244, 240, 254.7, 254.9, 255.7, 256, 360/244.2, 244.9
See application file for complete search history.

(56) References Cited

U.S. PATENT DOCUMENTS

| | | | | |
|---|---|---|---|---|
| 5,231,549 A * | 7/1993 | Morehouse et al. | ............ | 360/75 |
| 5,526,206 A * | 6/1996 | Shimizu | .................. | 360/254.8 |
| 5,973,887 A * | 10/1999 | Cameron | .................. | 360/254.8 |
| 6,134,076 A * | 10/2000 | Boutaghou et al. | ........ | 360/254.5 |
| 6,134,077 A * | 10/2000 | Misso et al. | .................. | 360/256 |
| 6,292,333 B1 * | 9/2001 | Blumentritt et al. | ....... | 360/254.8 |
| 6,487,052 B1 * | 11/2002 | Macpherson et al. | ...... | 360/256.2 |
| 6,507,460 B2 * | 1/2003 | Fayeulle et al. | ........... | 360/254.8 |
| 7,337,452 B2 * | 2/2008 | Freeman et al. | ............. | 720/662 |
| 2001/0033460 A1 * | 10/2001 | Fayeulle et al. | ........... | 360/254.8 |
| 2004/0240116 A1 * | 12/2004 | Kuwajima et al. | ........... | 360/255 |
| 2005/0018354 A1 * | 1/2005 | Takahashi | ................. | 360/254.8 |
| 2005/0207066 A1 * | 9/2005 | Kobayashi et al. | ........... | 360/255 |
| 2005/0280945 A1 * | 12/2005 | Duvall et al. | ............. | 360/254.7 |
| 2005/0286171 A1 * | 12/2005 | Kim et al. | ................. | 360/254.7 |

(Continued)

FOREIGN PATENT DOCUMENTS

JP    8-221915    8/1996

(Continued)

*Primary Examiner*—Julie Anne Watko
(74) *Attorney, Agent, or Firm*—Wenderoth, Lind & Ponack, L.L.P.

(57) ABSTRACT

The present invention provides a head holding member and a head holding method of a head actuator having a very high impact resisting property, and having a simple construction, and a disk device using the head holding member and the head holding method. The head holding member resists an impact applied at a stopping time, and a stable operation can be performed at a power turning-on time.

31 Claims, 20 Drawing Sheets

U.S. PATENT DOCUMENTS

| | | | |
|---|---|---|---|
| 2006/0268462 A1* | 11/2006 | Ohwe | 360/254.8 |
| 2008/0037176 A1* | 2/2008 | Matsuda et al. | 360/254.8 |
| 2009/0135515 A1* | 5/2009 | Satou | 360/75 |

FOREIGN PATENT DOCUMENTS

| | | |
|---|---|---|
| JP | 2803693 | 7/1998 |
| JP | 10-302418 | 11/1998 |
| JP | 2001-043644 | 2/2001 |
| JP | 2002-260356 | 9/2002 |
| JP | 2002-298531 | 10/2002 |

* cited by examiner

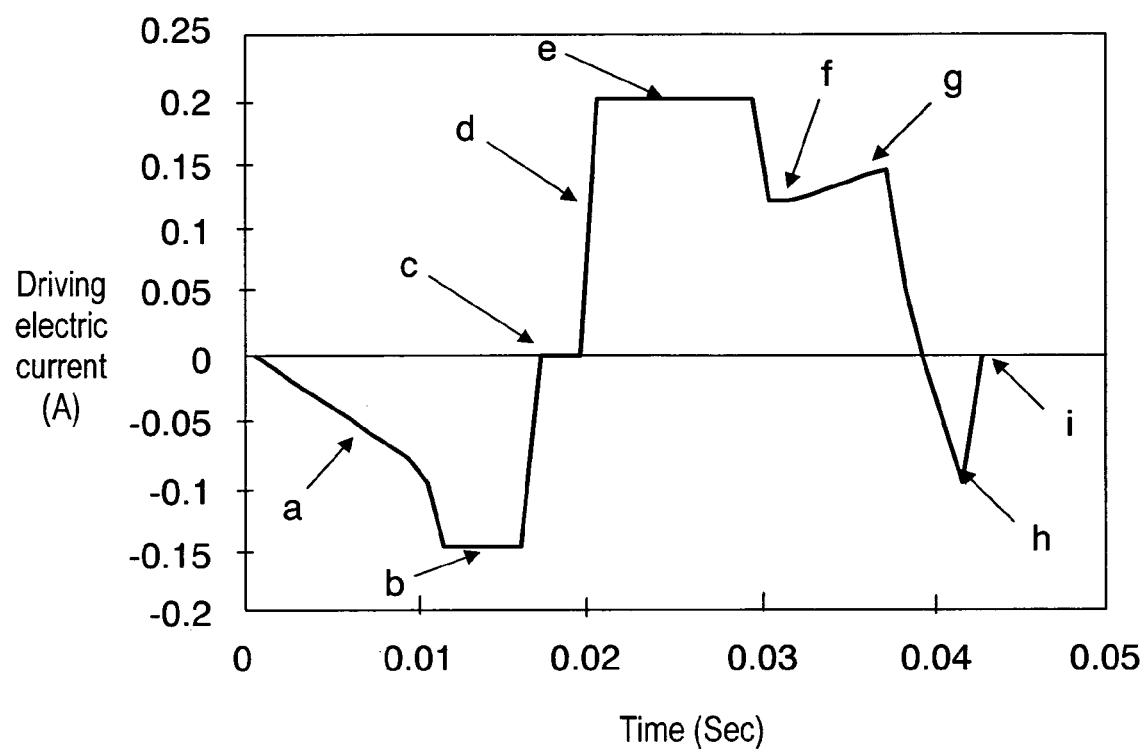

Enlargement of portion A

HEAD HOLDING MEMBER, DISK DEVICE WITH THE HEAD HOLDING MEMBER, AND HEAD HOLDING METHOD IN THE DISK, DEVICE

TECHNICAL FIELD

The present invention relates to a head holding mechanism of a disk device having a signal converting element (magnetic head) of a floating type, and more particularly, relates to a head holding member in an escaping position of an actuator used in the head holding mechanism of the disk device when the actuator is not operated and is unloaded, a disk device having this head holding member, and a head holding method in the disk device.

BACKGROUND ART

When the operation of the disk device is stopped, the actuator mounting the signal converting element is unload-operated from an area for recording data, and is moved and held in a predetermined area (parking zone) on a recording medium. Otherwise, the actuator is moved and held in a predetermined position near the outer circumference of the recording medium in which no signal converting element comes in contact with the surface of the recording medium. Namely, when the operation of the disk device is stopped, the actuator is held in a predetermined escaping position. Further, when an impact from the exterior is applied at the stopping time of the operation of the disk device, the actuator is moved from the escaping position to the data recording area on the recording medium, and the data area surface on the recording medium is damaged by a collision of the signal converting element and the recording medium surface. Otherwise, the data area surface on the recording medium is damaged by a sliding movement with respect to the signal converting element due to an operation start from a state in which the actuator comes in contact with the data recording area at the moving time to the data recording area as it is. Otherwise, a separate constructional part of the disk device and the actuator collide so that the constructional part and the actuator are damaged. A holding member or a holding method of the actuator for holding the actuator in the predetermined escaping position is adopted so as not to cause such fatal breakdowns.

An example of the disk device having the holding member of the conventional actuator will be explained next. First, with respect to a disk drive unit having the holding member of the actuator, a converting head (corresponding to the above signal converting element) is attached to one end of an actuator arm. A coil is attached to the other end of the actuator arm. A projection is integrally arranged on the other end side of the actuator arm. An iron piece is attached to the projection, and is rotatably attached around a rotary shaft so that the actuator as a voice coil motor (hereinafter called VCM) is constructed. Further, a permanent magnet is fixed to a housing so as to be opposed to the iron piece arranged in the actuator arm. The iron piece arranged in the actuator arm is magnetically attracted by the permanent magnet fixed to the housing. The actuator arm is fixed by the magnetic attractive force of the permanent magnet. Such a construction is proposed. In this example, the iron piece arranged in the actuator arm and the permanent magnet fixed to the housing function as the head holding member, and the head holding method using the magnetic attractive force generated by the permanent magnet is adopted.

In such a construction, at the stopping time of the operation of the disk drive unit, an electric current is supplied to a coil of the VCM, and the actuator arm is operated so as to be moved to the predetermined escaping position. When the actuator arm approaches the predetermined escaping position, the iron piece is attracted to the permanent magnet and the actuator arm can be fixed in the escaping position. In this state, even when an external force is applied, the actuator arm is fixed by the magnetic attractive force so that no actuator arm is moved. The data of the data recording area on the recording medium and the actuator are protected from unprepared movements of the converting head and the actuator arm (e.g., see Japanese Registered Patent No. 2803693).

With respect to an actuator lock method of the disk drive unit having the holding member of the actuator, the holding member of an actuator arm, similar to that of the example of the disk drive unit having the holding member of the above actuator, is arranged. Further, the holding member of an actuator arm constructed by a leaf spring having elasticity and a solenoid coil is arranged. The leaf spring having elasticity so as to be engaged with the actuator in the vertical direction and having stress in the upward direction is vertically moved in accordance with the movement of a plunger manufactured by iron and generated by supplying an electric current to the solenoid coil. A magnet as a first magnetic field supply means having a first magnetic force is arranged on the lower side of the plunger. A VCM yoke as a second magnetic field supply means having a second magnetic force is arranged on the upper side of the plunger. When a first electric current is supplied to the solenoid coil, magnetic force for pushing-up the plunger is generated and the leaf spring is moved on the upper side. When a second electric current different from the first electric current is supplied, magnetic force for pushing-down the plunger is generated and the leaf spring is moved on the lower side. Further, the leaf spring is fixed on the lower side by the first magnetic force of the magnet having a downward magnetic force greater than the upward stress of the leaf spring. In addition to the upward stress of the leaf spring, the leaf spring is attracted and fixed on the upper side by the second magnetic force of the VCM yoke. Such a construction is proposed.

In such a construction, at the operating time of the disk drive unit, the plunger is attracted in the direction of the magnet by the first magnetic force. Further, the leaf spring is pressed on the lower side by the plunger, and is fixed so as to attain a lock release state in which the leaf spring is fixed to a height for preventing no movement of the actuator. At the stopping time of the operation of the disk drive unit, the actuator is moved to a predetermined lock position (corresponding to the above escaping position). Further, the first electric current for generating the upward magnetic force and greater than the difference between the magnitude of the first magnetic force of the magnet and the magnitude of stress of the leaf spring is supplied to the solenoid coil. The leaf spring is moved in the upward direction. The leaf spring is then moved and fixed so as to attain a lock state fixed on the upper side. Here, the electric current is supplied to the solenoid coil only at a transfer time from the lock release state to the lock state, or a transfer time from the lock state to the lock release state. When the leaf spring is in each of the lock release state or the lock state fixed on the lower side or the upper side, no electric current is supplied to the solenoid coil. At the stopping time of the operation of the disk drive unit, the magnetic attractive force using the iron piece and the permanent magnet and the leaf spring are fixed on the upper side, and the actuator is locked in the escaping position as the lock state. Thus, the actuator can be fixed with respect to the vertical direction as well as the horizontal direction, and the movement of the actuator due to an impact can be prevented (e.g., see Japanese laid-open patent gazettes of JP-A-8-221915, JP-A-10-302418 and JP-A-2002-260356, etc.).

Further, a separate example of the disk drive unit having the lock mechanism of the actuator is proposed. In this example, the disk drive unit is constructed such that the actuator is arranged so as to be rotationally moved with an actuator swinging axis as a center, and a head arm and a coil arm are arranged so as to be mutually located on opposite sides through this actuator swinging axis. The disk drive unit of this construction has the following features (1) to (8). (1) The head arm is constructed by a carriage arm and a suspension arm, and this suspension arm has a tab in which a convex portion for escaping the suspension arm to a ramp block is formed. A head slider mounting a signal converting element is mounted to the vicinity of this tab. (2) The coil arm mounting a voice coil onto its inner face is constructed by an outer arm and an inner arm. On the other hand, (3) a lamb block arranged in the escaping position of the actuator and an inertia latch mechanism are stored to the interior of an enclosure. (4) The ramp block fixed to the enclosure by screws has plural ramps convexly arranged in the horizontal direction from the side face of a ramp support. The ramp has a composite plane including a first slanting face, a top portion plane, a second slanting face, a bottom portion plane and a third slanting face. (5) The inertia latch mechanism is constructed by an inertia lever able to be swung with an inertia lever swinging axis as a center, a latch lever able to be swung with a latch lever swinging axis as a center, and a spring for holding the latch lever in an arm opening position. In inertia moments of the inertia lever and the latch lever around the respective swinging axes, the inertia moment of the inertia lever is set to be greater than that of the latch lever. (6) The inertia lever has an inertia arm and a balance arm in which a first engaging projection engaged with the latch lever in a first engaging portion, and a second engaging projection engaged with the latch lever in a second engaging portion are formed. (7) The latch lever has a latch arm and an auxiliary arm in which two spring engaging projections, a positioning projection and a latch projection engaged with an acting side end portion of the spring are formed. The positioning projection is arranged to determine an actuator opening position and an actuator latch position of the latch lever. The latch projection is arranged to be engaged with a tip portion of the inner arm of the actuator and latch the actuator when the latch lever is moved to the actuator latch position. (8) An actuator lock mechanism is constructed by the ramp block and the inertia latch mechanism, and functions as the head holding member.

In such a construction, when no disk drive unit is operated, the actuator is unloaded to the escaping position, and the tab of the suspension arm is held in the bottom portion plane of the ramp. With respect to a weak impact, a tab convex portion of the suspension arm climbs the second slanting face or the third slanting face of the ramp block. Thus, swinging energy of the head arm is attenuated and the movement of the head arm is restrained. The head arm is prevented from moving from the escaping position to the disk side or its opposite side. The ramp block functions as the holding member of the actuator for holding the head arm in the escaping position. In the operation of the inertia latch mechanism when an impact is applied to the disk drive unit at the non-operating time of the disk drive unit, torque intended to make a rotating movement in the counterclockwise direction is applied to each of the inertia lever and the latch lever with the respective swinging axes as centers when torque for making a swinging movement in the counterclockwise direction is applied to the actuator by the impact from the exterior. If the torque applied to the inertia lever is greater than resultant torque provided by the torque due to the impact applied to the latch lever, and the torque of the spring intended to rotate the latch lever in the clockwise direction with the latch lever swinging axis as a center, the inertia lever is rotated in the counterclockwise direction irrespective of the direction of the torque applied to the latch lever. In the first engaging portion, the latch lever is pulled by the first engaging projection, and is swung in the counterclockwise direction. A latch projection of the latch arm is engaged with the tip portion of the inner arm moved from a state located in the escaping position so that the actuator is latched. Thereafter, the tab of the actuator is pushed back to the bottom portion plane of the ramp block by the operation of the second slanting face of the ramp block. The engagement of the inner arm tip portion and the latch projection is released. The latch arm is returned to the actuator opening position by the operation of the spring. When torque for making the swinging movement in the clockwise direction is applied to the actuator by the impact from the exterior, torque for making a rotating movement in the clockwise direction is applied to each of the inertia lever and the latch lever with the respective swinging axes as centers. Torque intended to make the rotating movement in the clockwise direction with the latch lever swinging axis as a center is always applied to the latch lever by the spring in addition to the torque due to the impact. If the torque applied to the inertia lever is greater than resultant force provided by the torque due to the impact applied to the latch lever and the torque due to the spring in the second engaging portion, the latch lever is pushed by the second engaging projection in the second engaging portion. The latch lever is swung in the counterclockwise direction. The latch projection of the latch arm collides with a crush stop constructed by an elastic body for regulating a swinging range of the actuator, and is engaged with the inner arm tip portion rebounded in the counterclockwise direction so that the actuator is latched. The inertia moment of the inertia lever is set to be greater than the inertia moment of the latch lever such that the torque due to the impact applied to the inertia lever is greater than the torque applied to the latch lever by the impact, and the swinging movement is made in the direction of the torque of the inertia lever due to the impact. The swinging distance of the latch projection from an opening point to a latch point, the position of the latch point, the distance from the latch projection to the swinging axis, etc. are set so as to move the latch projection to the latch point before the inner arm tip portion is moved from an escaping point to the latch point. The actuator is then latched to the escaping position, and is locked. Thus, the head arm and the head slider are prevented from entering an arranging space of the disk.

However, in the holding method of the actuator used in the disk drive unit having the holding member of the above conventional actuator, the actuator arm is fixed in the escaping position of the actuator by the attractive force of the iron piece arranged in the actuator arm and the permanent magnet fixed to the housing at the stopping time of the operation of the disk drive unit. In the actuator holding method having such a construction, a comparatively high impact resisting property is provided with respect to the impact of the same direction as the rotating direction of the actuator. However, the impact resisting property with respect to a large impact applied for a short time or an impact having a vertical component with respect to the rotating direction of the actuator is comparatively low. Therefore, a problem exists in that no holding function with respect to the impact can be sufficiently shown. Further, the iron piece and the permanent magnet are required to hold the actuator in the escaping position. Therefore, a problem also exists in that the number of parts constituting the device is increased and cost is increased.

Further, in the above conventional holding method of the actuator, when a comparatively large impact is applied, it is constructed such that the actuator is held in the escaping position so as not to move the actuator located in the escaping position up to the data recording area of the recording medium. In particular, in the example for arranging the actuator holding member constructed by the lock means and the solenoid coil, the actuator is constructed so as to be held by the iron piece arranged in the actuator arm, the permanent magnet arranged in the housing, the leaf spring for gripping the actuator, the magnet for fixing this leaf spring onto the lower side, the plunger for vertically moving the leaf spring, and the solenoid coil for vertically moving the plunger. At the stopping time of the operation of the disk drive unit, the actuator is moved to the escaping position, and the leaf spring is moved in the upward direction as the plunger is vertically moved. The leaf spring is then set to the lock state, and the actuator is locked in the escaping position. Accordingly, the impact resisting property is also provided with respect to the comparatively large impact. However, when a very large impact of the same direction as the moving direction of the plunger is applied, it is necessary to set the stress onto the upper side of the leaf spring and the second magnetic force of the VCM yoke to values for resisting this impact so as to maintain the lock state of the leaf spring. Accordingly, it is necessary to flow a large electric current to the solenoid coil and generate large magnetic force so as to move the plunger in the downward direction against such large resultant force provided by the stress onto the upper side of the leaf spring and the second magnetic force of the VCM yoke, and set the leaf spring to the lock release state. Therefore, the solenoid coil is large-sized. Further, a space for arranging respective parts constituting the holding member of the actuator for locking the actuator in the escaping position is required. Therefore, a problem exists in that it becomes difficult to make the disk drive unit compact. Further, many parts are required to construct the holding mechanism of the actuator. Therefore, a problem also exists in that this requirement increases the cost of the device.

In the disk drive unit constructed such that the actuator is rotatably arranged with the swinging axis as a center and the head arm and the coil arm are arranged so as to be mutually located on the opposite sides through this swinging axis, the inertia latch mechanism is constructed by the inertia lever, the latch lever and the spring. When a comparatively large impact is applied at the non-operating time of the disk drive unit, the inertia lever is rotated and the latch lever is rotated in the counterclockwise direction irrespective of the direction of torque applied to the latch lever. Thus, the latch projection of the latch arm is engaged with the inner arm tip portion in the coil arm of the actuator moved from a state located in the escaping position, and the actuator is latched. Therefore, the inertia moment of the inertia lever is set to be greater than the inertia moment of the latch lever. In the lock mechanism of the actuator using the construction having such an inertia latch mechanism, a non-sensitive band area with respect to the impact can be set to be very small. Accordingly, reliability as the lock mechanism of the actuator is improved. However, many parts are required to construct the inertia latch mechanism. Further, a space for arranging these parts is also required. Therefore, a problem exists in that these requirements increase the cost of the device, and become an obstacle with respect to compactness.

The present invention solves the above problems, and its object is to provide a head holding member and a head holding method of the actuator having a very high impact resisting property by a very simple construction, and a disk device using the head holding member and the head holding method.

DISCLOSURE OF THE INVENTION

To achieve the above object, the present invention resides in a head holding member for guiding a tab portion formed at one end of a head support arm constituting an actuator to an escaping position, and holding the tab portion in the escaping position when an unloading operation of the actuator is performed by an operation stopping command of a disk device;

wherein the shape of the escaping position has:

a head holding plane for holding the tab portion;

a load side projecting portion formed on the loading side of the head holding plane; and an unload side wall face formed on the unloading side of the head holding plane. A load side wall face having an angle perpendicular to the head holding plane is formed on the loading side of the head holding plane, and a head upper wall face continuing to the load side wall face forms a face opposed to the head holding plane of the load side projecting portion. A load side wall face having an angle smaller than 90° with respect to the head holding plane is formed on the loading side of the head holding plane. A third slanting face having an angle greater than 90° with respect to the head holding plane, and a head moving plane parallel to the head holding plane are formed between the head holding plane and the unload side wall face. A head moving slanting face having an angle greater than 90° with respect to the head holding plane, and a head moving plane parallel to the head holding plane are formed between the head holding plane and the load side wall face. The head holding plane is formed so as to be parallel to the recording face of a recording medium of the disk device, or have an acute angle with respect to the recording face. The width of the head holding plane may be greater than the width of the tab portion of the head support arm in a direction perpendicular to the rotation center of a rotating axis of the actuator.

In accordance with these constructions, the degree of freedom of design of an actuator constructional member such as the head support arm mounting the head slider thereto, etc. can be greatly enlarged. For example, the head support arm constituting the actuator is formed by a material of high rigidity, and the impact resisting property with respect to a large impact from the exterior, etc. is improved. The load with respect to the head slider assembled into the actuator can be increased. When a disturbance of the impact or vibration is applied during stoppage of the operation of the disk device, it is restrained that the head is moved onto the disk, and the head support arm can be held. Thus, the head holding member and the disk device having very high impact resisting performance can be realized.

In the head holding member of the present invention, the head holding plane and the unload side wall face are connected by a curved surface. Otherwise, the head holding plane and the load side wall face are connected by a curved surface. In accordance with these constructions, the contact face of the tab portion and a guide face of the ramp portion is enlarged, and contact stress due to pressing of the tab portion is reduced. Thus, wear due to the contact of the plane and the tab can be reduced, and the disk device having high reliability can be realized. This particularly achieves a high recording density. Therefore, in the disk device in which the clearance between the head and the medium is set to several nm, attachment of wearing powder to the disk can be prevented and high reliability can be obtained.

To achieve the above object, the present invention also resides in a head holding method in a disk device including:

a recording medium rotatably arranged around a rotating axis;

a head support arm having a head and a tab portion at one end thereof, and able to be rotated around a first rotating axis parallel to the rotating axis by a first bearing portion arranged in a position separated from the rotating axis;

a second bearing portion arranged between the head and the first bearing portion and able to be rotated around a second rotating axis perpendicular to a center line of the longitudinal direction of the head support arm;

two or more abutting portions located on the second rotating axis and abutting on the head support arm or the second bearing portion;

a leaf spring portion for connecting the head support arm and the second bearing portion; and a ramp portion for holding the tab portion at an escaping time of the head support arm;

wherein, when the tab portion is moved to an escaping position to perform an unloading operation of the head support arm by an operation stopping command of the disk device in the ramp portion in which a load side projecting portion formed on the loading side of the head holding plane for preventing the movement of the tab portion from the escaping position to the direction of the recording medium, an unload side wall face formed on the unloading side of the head holding plane, and the head holding plane for holding the tab portion in the escaping position are formed the head holding method comprising:

applying forces in the radial direction of the recording medium and a direction perpendicular to the radial direction and biasing force of the leaf spring portion to the head support arm;

moving the head support arm in the radial direction of the recording medium; and abutting the tab portion on the unload side wall face of the ramp portion and then holding the tab portion in the head holding plane as the escaping position of the tab portion by at least the biasing force of the leaf spring portion among the forces applied to the head support arm. After the unloading operation for moving and holding the tab portion of the head support arm in the head holding plane of the ramp portion is performed by the operation stopping command of the disk device, the tab portion may be once operated on the unload side and may be operated on the load side by a load command of the disk device. The head support arm may have a voice coil connected to the head support arm through a voice coil holder, and the head support arm may swing around the first rotating axis by supplying an electric current to the voice coil and operating the voice coil. The waveform of a driving electric current applied to the voice coil connected to the head support arm may be set to a pulse waveform when the head support arm is operated on the load side.

In accordance with these head holding methods, when electric power is stopped during the operation of the disk device, or when an emergency stopping command is inputted to the disk device, the energy of a collision of the tab portion and the third slanting face is restrained so as to become small. Further, damage caused in the tab portion of the head support arm or the third slanting face of the ramp portion can be restrained. Further, even when a large impact from the exterior is applied at the stopping (non-operating) time of the operation of the disk device, no tab portion of the head support arm arranging the head slider therein is separated from the head holding plane of the ramp portion as its escaping position. Thus, the head holding method able to stably hold the head can be realized.

Further, to achieve the above object, the present invention also resides in a disk device including:

a recording medium rotatably arranged around a rotating axis;

a head support arm having a head and a tab portion at one end thereof, and able to be rotated around a first rotating axis parallel to the rotating axis by a first bearing portion arranged in a position separated from the rotating axis;

a second bearing portion arranged between the head and the first bearing portion and able to be rotated around a second rotating axis perpendicular to a center line of the longitudinal direction of the head support arm;

two or more abutting portions located on the second rotating axis and abutting on the head support armor the second bearing portion;

a leaf spring portion for connecting the head support arm and the second bearing portion; and a ramp portion for holding the tab portion at an escaping time of the head support arm;

wherein, when the tab portion is moved to an escaping position in the ramp portion in which a load side projecting portion formed on the loading side of the head holding plane for preventing the movement of the tab portion from the escaping position to the direction of the recording medium, an unload side wall face formed on the unloading side of the head holding plane, and the head holding plane for holding the tab portion in the escaping position are formed;

forces in the radial direction of the recording medium and a direction perpendicular to the radial direction and biasing force of the leaf spring portion are applied to the head support arm; the head support arm is moved in the radial direction of the recording medium; and the tab portion abuts on the unload side wall face of the ramp portion and is then held in the head holding plane as the escaping position of the tab portion by at least the biasing force of the leaf spring portion among the forces applied to the head support arm. In addition to this construction, after the unloading operation for moving and holding the tab portion of the head support arm in the head holding plane of the ramp portion is performed by an operation stopping command of the disk device, the tab portion can be once operated on the unload side and is operated on the load side by a load command of the disk device, and can be jumped up without abutting on the unload side wall face lower portion. The head holding plane and the unload side wall face can be connected by a curved surface. A load side wall face having an angle perpendicular to the head holding plane can be formed on the loading side of the head holding plane, and a head upper wall face continuing to the load side wall face can form a face opposed to the head holding plane of the load side projecting portion. The head holding plane and the load side wall face can be connected by a curved surface. A load side wall face having an angle smaller than 90° with respect to the head holding plane can be formed on the loading side of the head holding plane, and the load side wall face can form a face opposed to the head holding plane of the load side projecting portion. A third slanting face having an angle greater than 90° with respect to the head holding plane, and a head moving plane parallel to the head holding plane can be formed between the head holding plane and the unload side wall face. A head moving slanting face having an angle greater than 90° with respect to the head holding plane, and a head moving plane parallel to the head holding plane can be formed between the head holding plane and the load side wall face. The head holding plane can be also formed so as to be parallel to the recording face of a recording medium of the disk device, or have an acute angle with respect to the recording face. In addition to these constructions, the width of the head holding plane may be greater than the width of the tab portion of the head support arm in a direction perpendicular to the rotation center of a rotating axis of the actuator. The tab portion may be once operated on the unload side and may be then operated on the load side by a load command of the disk device. The waveform of a driving electric current applied to a voice coil may be set to a pulse waveform when the head support arm is operated on the load side. A second bearing may be a pivot bearing with the pivot as an abutting point. The pivot may be formed in a conical shape or a pyramidal shape. The second bearing may be a pivot bearing with one point of an abutting curved surface as an abutting point, or with an abutting ridge-line as an abutting line. The head support arm may have a voice coil connected to the head support arm through a voice coil holder, and the head support arm may swing around the first rotating axis by supplying an electric current to the voice coil and operating the voice coil. The tab portion of the head support arm may have pressing force for pressing against the head holding plane of the ramp portion at a stopping time of the rotation of the recording medium. The ramp portion may be arranged in the vicinity of the outer circumference of the recording medium, and a first magnet may be arranged so as to be opposed to the voice coil on the side opposed to the recording medium side with respect to the head support arm. The ramp portion may be arranged in the vicinity of the rotation center of the recording medium, and a second magnet may be arranged so as to be opposed to the second voice coil on the recording medium side with respect to the head support arm.

In accordance with these constructions, when electric power is stopped during the operation of the disk device, or when an emergency stopping command is inputted to the disk device, the energy of a collision between the tab portion and the head holding portion of the ramp portion is restrained so as to become small. Further, damage caused in the tab portion of the head support arm or the head holding portion of the ramp portion is further restrained so as to become small, and durability of the ramp portion can be improved. Further, even when a large impact from the exterior is applied at the stopping (non-operating) time of the operation of the disk device, no tab portion of the head support arm arranging the head slider therein is separated from the head holding plane of the ramp portion as its escaping position so that the head can be stably held. Further, at the starting time of the operation of the disk device, repulsive driving torque is generated between the magnet and the voice coil constituting the VCM. Torque intended to rotate the head support arm in the direction perpendicular to the surface of the recording medium is applied. Thus, force for moving the tab portion of the head support arm upwards is generated. Further, force for rotating the actuator around the rotating axis is also generated. Thus, the actuator is separated from the escaping position, and can be easily moved in the direction on the surface of the recording medium. Accordingly, the disk device having high reliability and durability and stably holding the head at low cost can be realized.

BRIEF DESCRIPTION OF THE DRAWINGS

FIG. 9 is a view showing a driving electric current applied to the VCM at the driving time of the disk device in embodiment 1 of the present invention.

DETAILED DESCRIPTION OF THE PREFERRED EMBODIMENTS

The embodiments of the present invention will next be explained by using the drawings. Further, a magnetic disk device as an example will be explained as a disk device.

Embodiment 1

Figure 1:
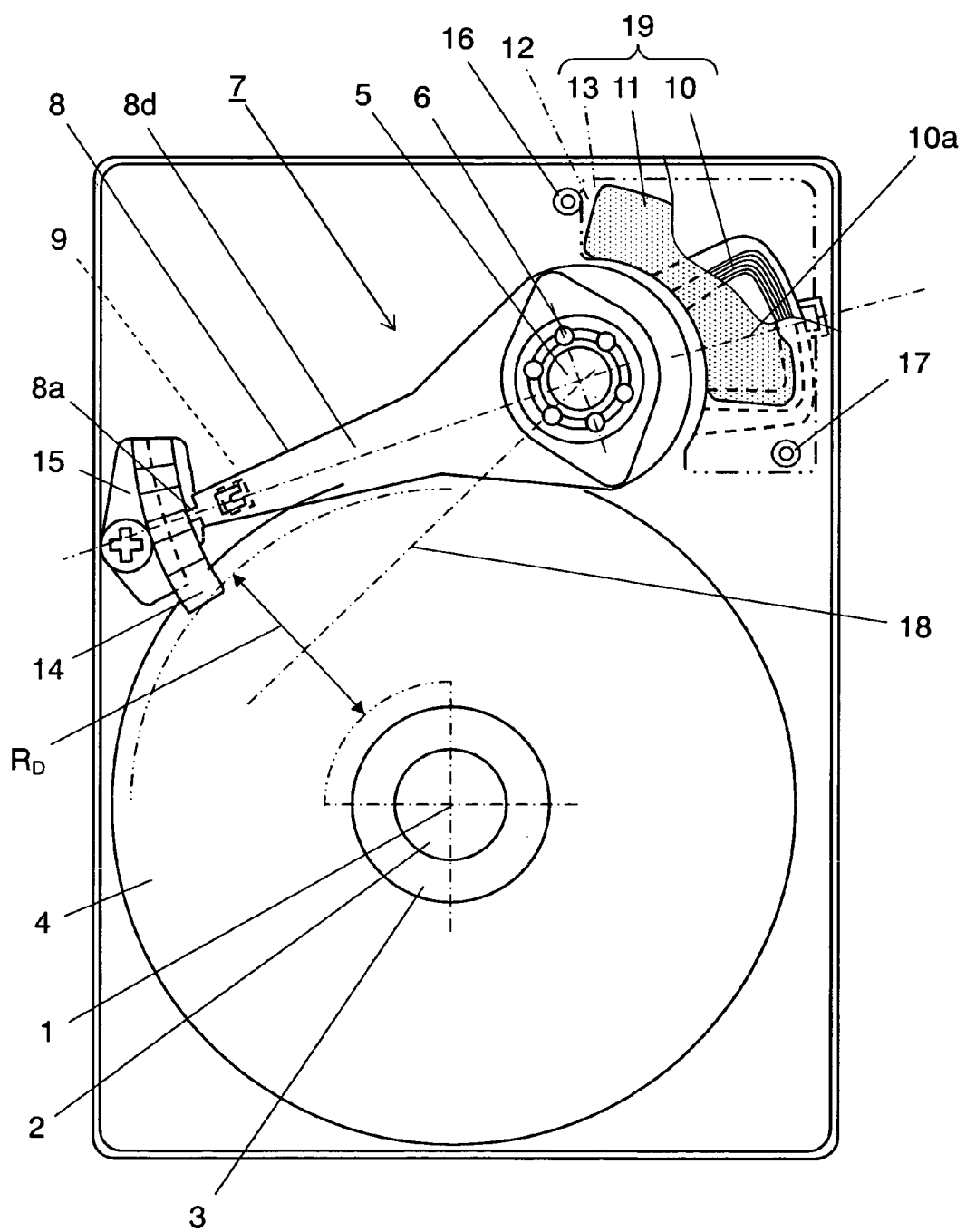
FIG. 1 is a plan view showing the schematic construction of a main portion of a magnetic disk device arranged in a disk device in embodiment 1 of the present invention.
Figure 2:
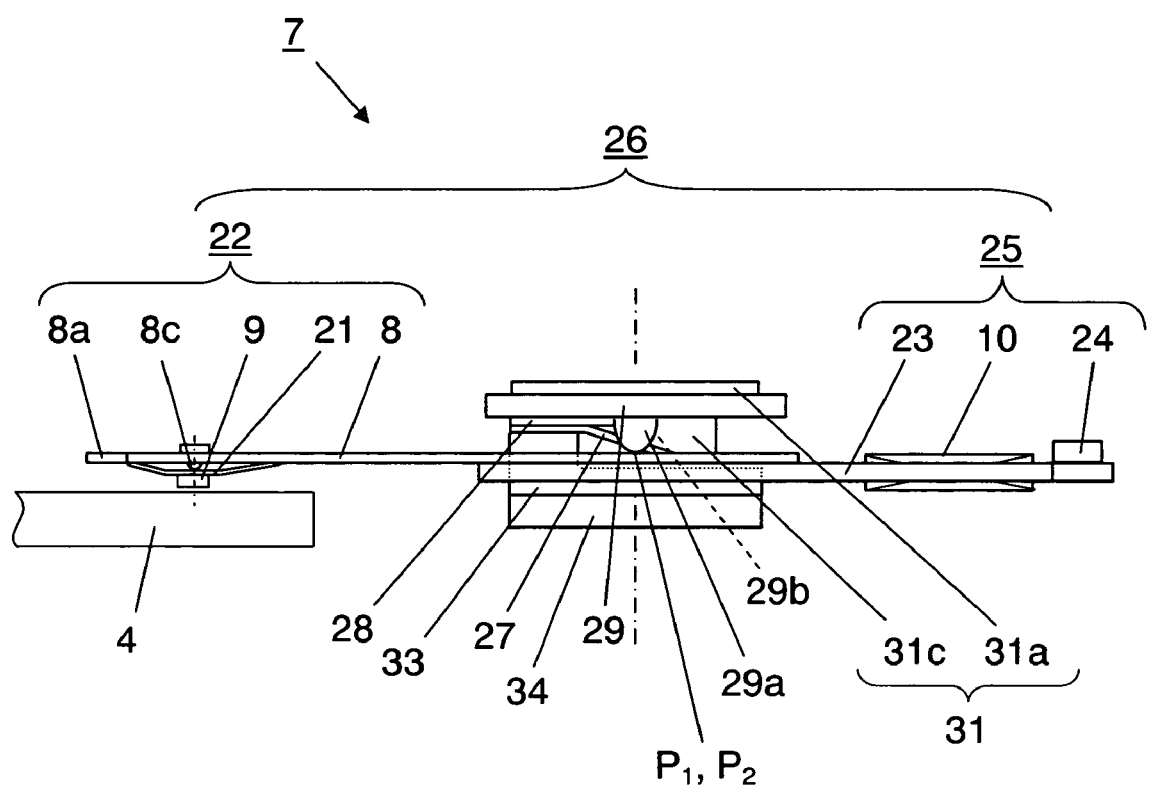
FIG. 2 is a side view showing the construction of an actuator arranged in the magnetic disk device shown in FIG. 1.
Figure 3:
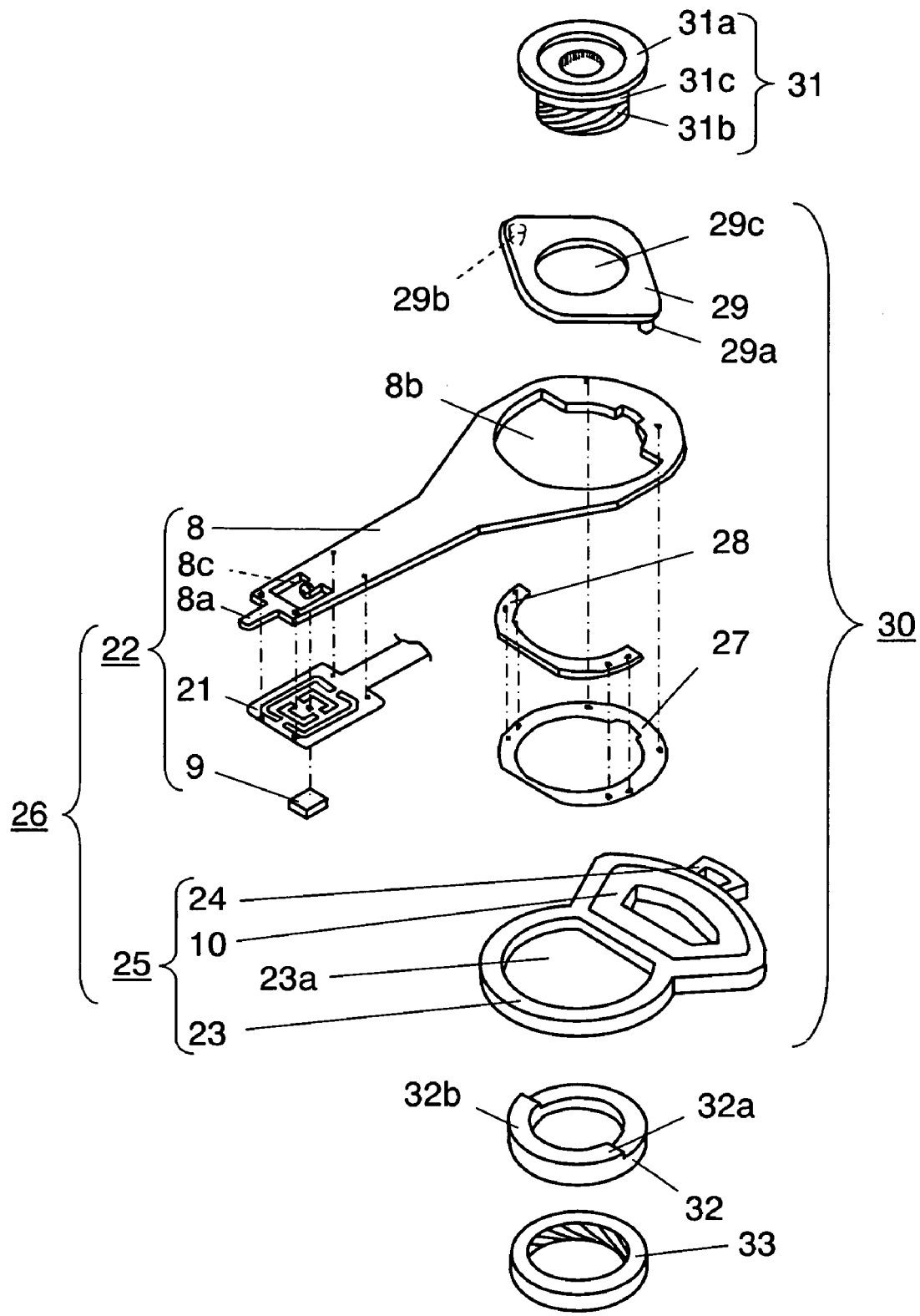
FIG. 3 is an exploded perspective view showing the construction of the actuator arranged in the magnetic disk device shown in FIG. 1.
Figure 4:
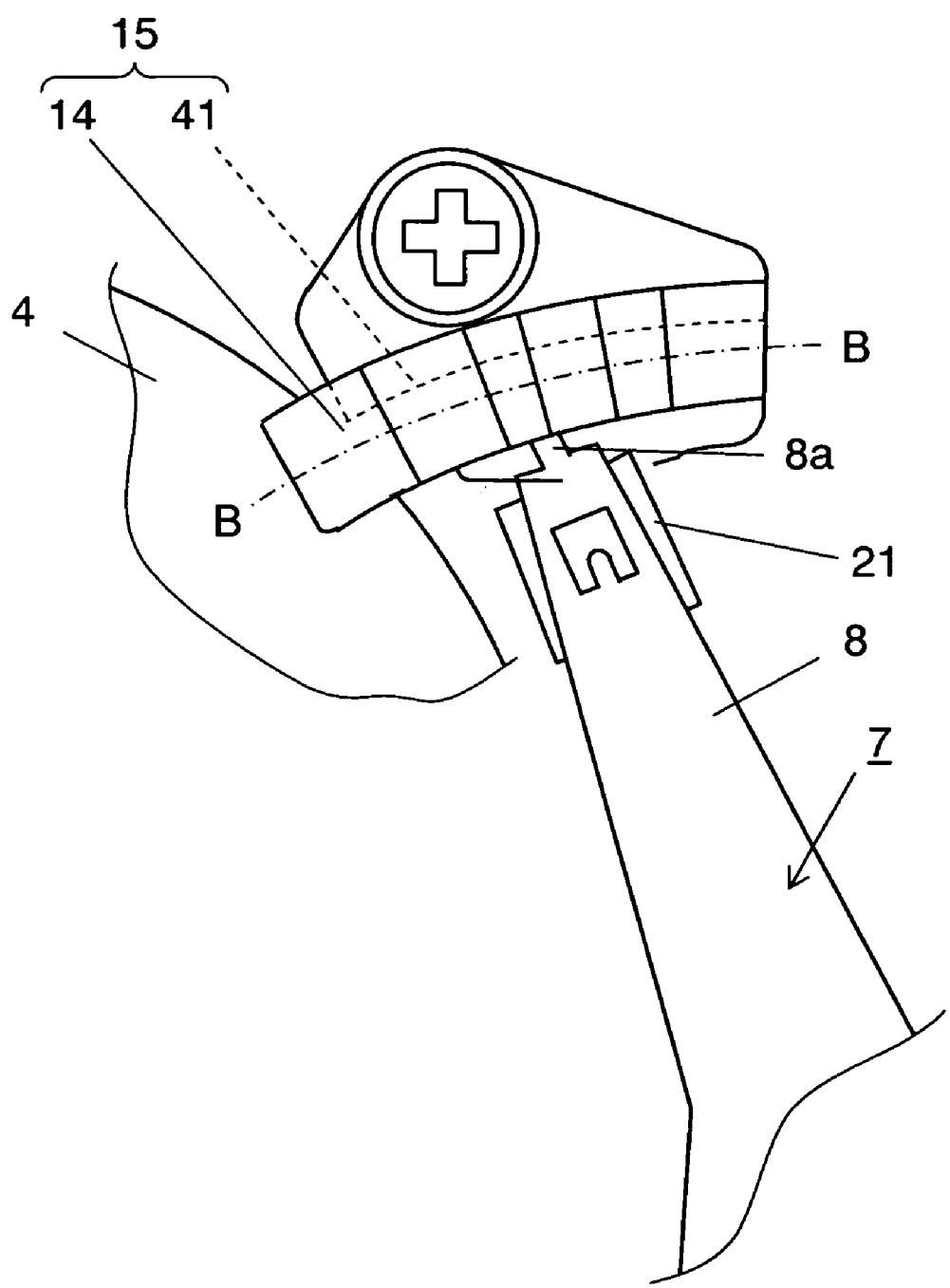
FIG. 4 is a plan view showing the vicinity of a ramp block when the actuator arranged in the magnetic disk device shown in FIG. 1 is located in an escaping position.
Figure 5:
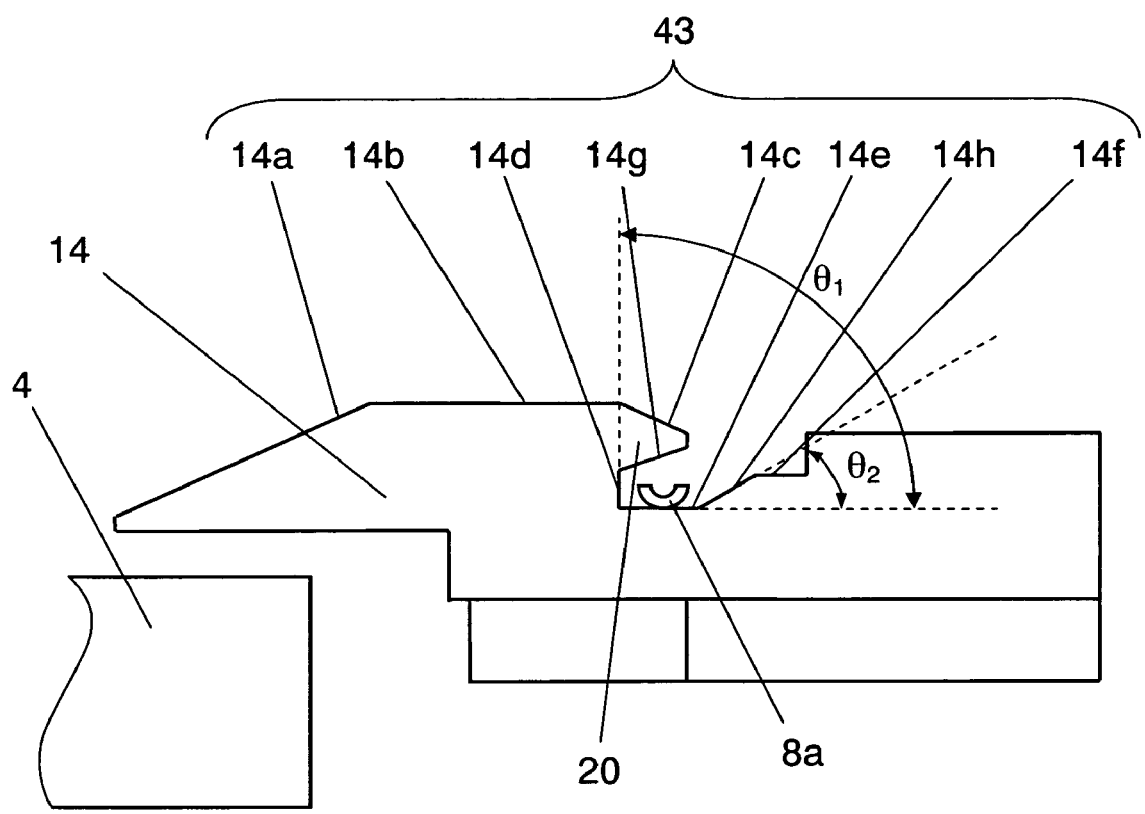
FIG. 5 is a cross-sectional view of a line B-B showing a ramp portion and a recording medium in FIG. 4.
Figure 6:
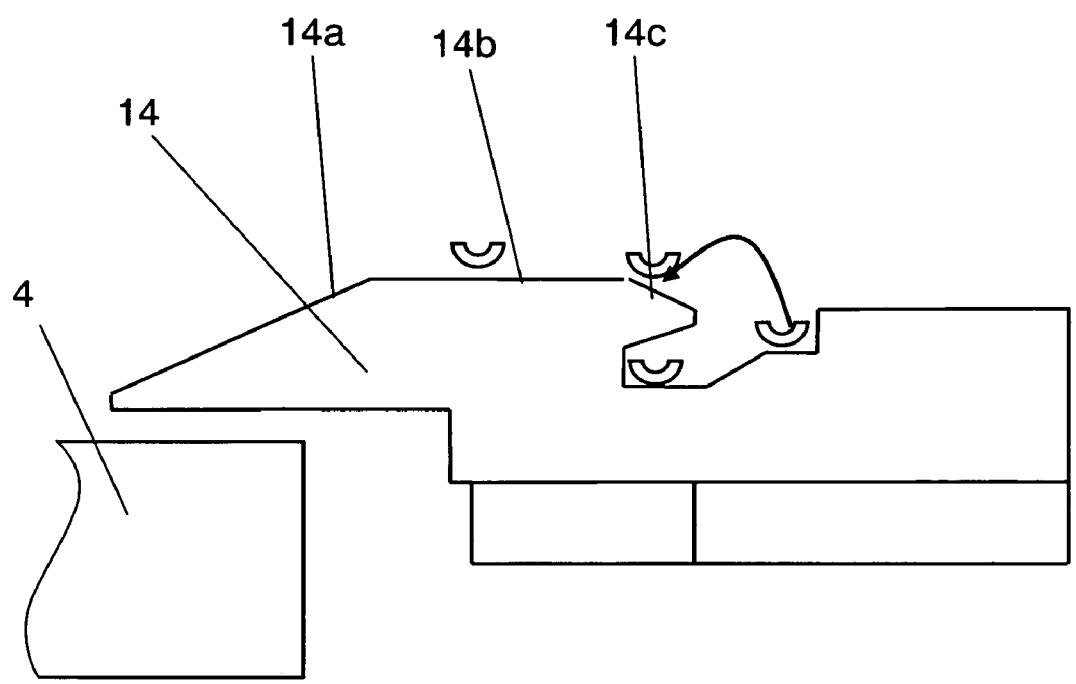
FIG. 6 is a view showing the operation of a tab portion in the cross-sectional view in FIG. 5.
Figure 10:
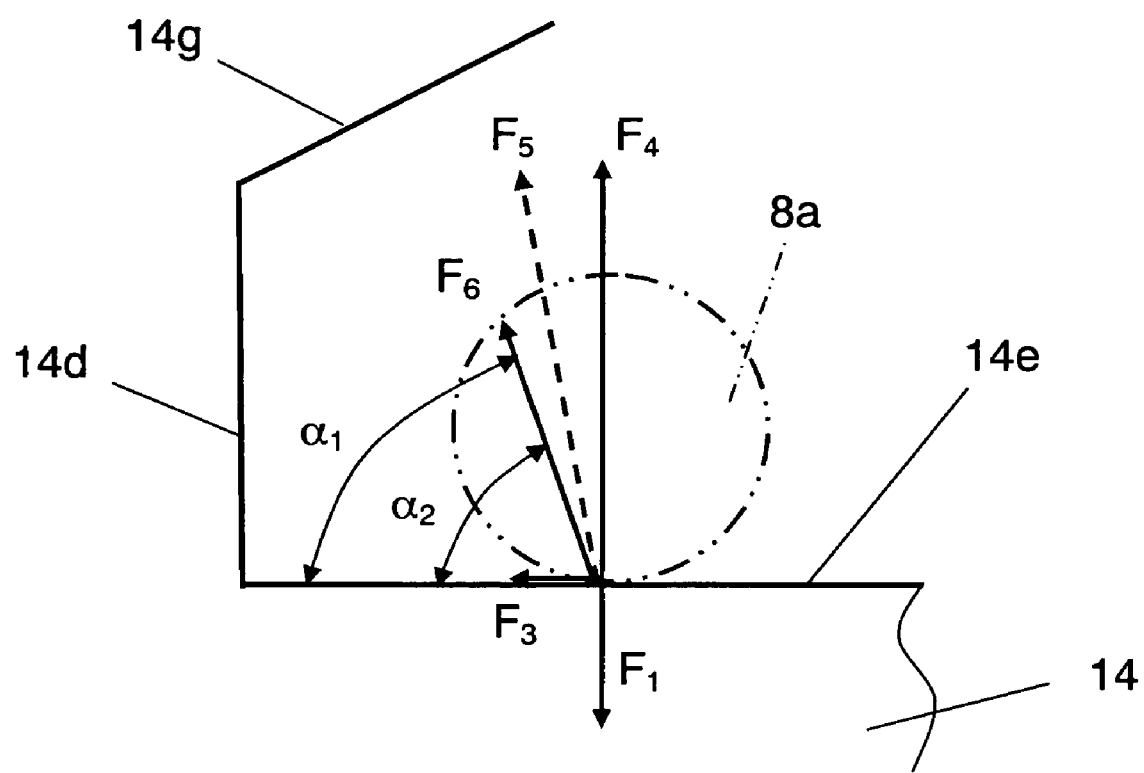
FIG. 10 is a view showing the relation of force applied to the tab portion when the tab portion is located in a head holding plane.
Figure 11:
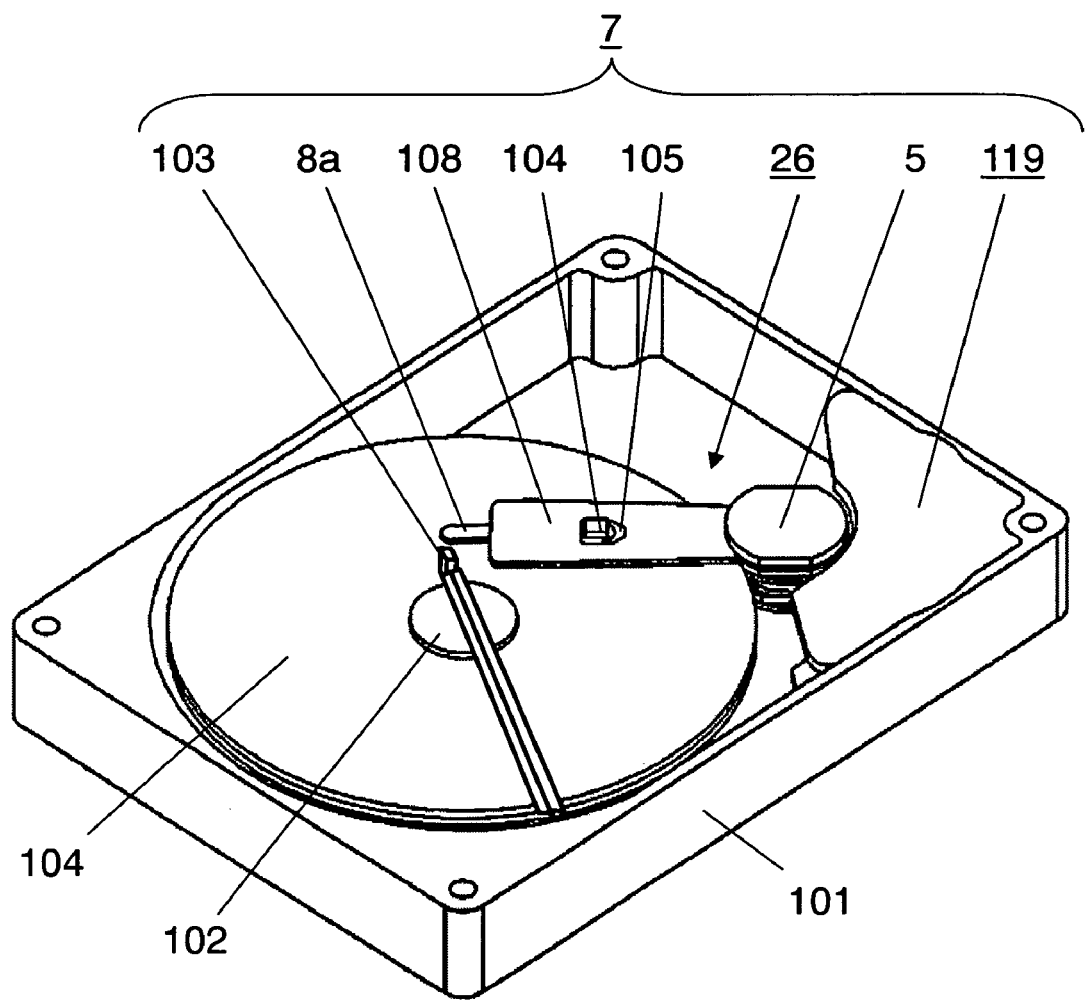
FIG. 11 is a perspective view showing the schematic construction of a main portion of a separate magnetic disk device in embodiment 1 of the present invention.
Figure 12:
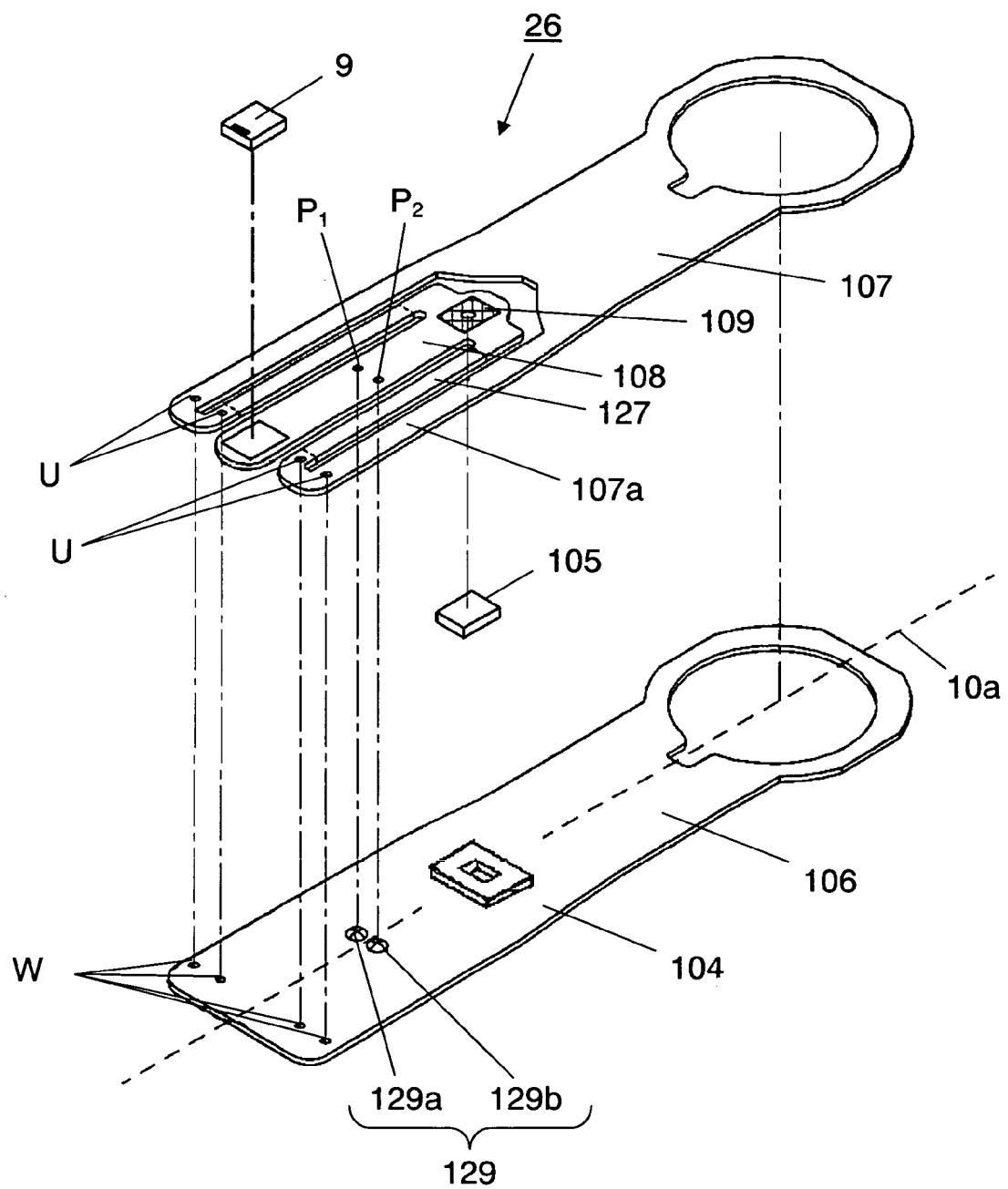
FIG. 12 is an exploded perspective view showing the construction of an actuator arranged in the separate magnetic disk device in embodiment 1 of the present invention shown in FIG. 11.

FIGS. 1 to 12 are views for explaining a head holding member of an actuator arranged in a disk device and its head holding method in embodiment 1 of the present invention. FIG. 1 is a plan view showing the schematic construction of a main portion of a magnetic disk device arranged in a disk device in embodiment 1 of the present invention. FIG. 2 is a side view showing the construction of an actuator arranged in the magnetic disk device shown in FIG. 1. FIG. 3 is an exploded perspective view showing the construction of the actuator arranged in the magnetic disk device shown in FIG. 1. FIG. 4 is a plan view showing the vicinity of a ramp block when the actuator arranged in the magnetic disk device shown in FIG. 1 is located in an escaping position. FIG. 5 is a cross-sectional view of a line B-B showing a ramp portion and a recording medium in FIG. 4. FIG. 6 is a view showing the operation of a tab portion in the cross-sectional view in FIG. 5. FIGS. 7A to 7E are cross-sectional views showing various kinds of shapes of the tab portion. FIG. 8A is a graph showing the relation of the position of a VCM at a VCM driving time and rotating torque of the actuator. FIG. 8B is a graph showing the relation of the position of the VCM at the VCM driving time and repulsive driving torque applied to the VCM. FIG. 8C is a graph showing the relation of the position of the VCM at the VCM driving time and the direction of force applied to the VCM. FIG. 9 is a view showing a driving electric current applied to the VCM at the driving time of the disk device in embodiment 1 of the present invention. FIG. 10 is a view showing the relation of force applied to the tab portion when the tab portion is located in a head holding plane. FIG. 11 is a perspective view showing the schematic construction of a main portion of a separate magnetic disk device in embodiment 1 of the present invention. FIG. 12 is an exploded perspective view showing the construction of an actuator arranged in the separate magnetic disk device in embodiment 1 of the present invention shown in FIG. 11. FIGS. 1 and 11 are shown in a state in which an upper cover is detached and an upper side yoke is omitted.

In FIG. 1, rotor hub portion 3 is fixedly attached to rotating shaft 2 of an unillustrated spindle motor rotated around rotation center 1. Recording medium 4 forming a recording medium layer on its surface is placed on rotor hub portion 3. On the other hand, actuator 7 is constructed by a signal converting element swinging arm rotatably pivoted around rotating shaft 5 through bearing 6. Tab portion 8a is formed in one end portion of actuator 7. Head slider 9 is arranged on the side of rotating shaft 5 from tab portion 8a. An unillustrated magnetic head as a signal converting element is mounted to head slider 9 through an unillustrated gimbal mechanism. Voice coil 10 is arranged at the other end of actuator 7. Voice coil 10 is rotated around rotating shaft 5 in a direction parallel to the surface of recording medium 4. Upper side yoke 12 fixedly attaching magnet 11 thereto is attached to a chassis or an unillustrated separate box body above voice coil 10, i.e., on the side opposed to recording medium 4 with respect to actuator 7 so as to be opposed to voice coil 10. Lower side yoke 13 is attached to the chassis or the separate box body below voice coil 10 and is opposed to voice coil 10 so as to nip voice coil 10. VCM 19 is constructed by voice coil 10, magnet 11 fixedly attached to upper side yoke 12, and lower side yoke 13. Ramp block 15 is attached to the chassis or the separate box body. Ramp block 15 is a head holding member having ramp portion 14. A guide portion is arranged in ramp block 15, and ramp block 15 abuts on tab portion 8a and vertically guides actuator 7. VCM 19 is operated by supplying an electric current to voice coil 10 opposed to magnet 11. Thus, actuator 7 is rotated in the radial direction of recording medium 4. At an operating time of the magnetic disk device, actuator 7 is rotated around rotating shaft 5 and is moved onto a data recording area of rotated recording medium 4. At a non-operating time of the magnetic disk device, actuator 7 is rotated in the clockwise direction and is rotated up to a predetermined position of ramp portion 14 as an escaping position. As is publicly known, crush stops 16, 17 are arranged in the chassis, the box body or a separate structural member to prevent actuator 7 from being excessively swung in the clockwise direction (the direction on the side opposed to rotation center 1 of recording medium 4, i.e., an unload direction) or the counterclockwise direction (the rotation center 1 side direction of recording medium 4, i.e., a load direction). Crush stop 16 abuts on actuator 7 so as to prevent that actuator 7 is rotated in the clockwise direction and is separated from ramp portion 14.

Here, magnet 11 fixedly attached to upper side yoke 12 opposed to voice coil 10 constituting VCM 19 fixedly attached to actuator 7 will be explained. In FIG. 1, with respect to the position of actuator 7 when an unillustrated magnetic head is located in central position 18 of recordable area $R_D$ of recording medium 4 by rotating actuator 7, magnet 11 is magnetized so as to conform the boundary of the N-pole and the S-pole of magnet 11 to the position corresponding to center line 10a of the rotating circumferential direction of voice coil 10. Simultaneously, magnet 11 is formed and is fixedly attached to upper side yoke 12 such that the width of magnet 11 for locating actuator 7 in the escaping position is greater than the width of magnet 11 in the radial direction of rotating shaft 5 (the longitudinal direction of actuator 7) corresponding to an operating range of voice coil 10 when actuator 7 is operated within recordable area $R_D$ of recording medium 4.

Next, the construction of actuator 7 will be explained by using FIGS. 2 and 3.

In FIGS. 2 and 3, head support arm 8 has tab portion 8a in one end portion and hole portion 8b in the other end portion. Head slider 9 is arranged in head support arm 8 and an unillustrated magnetic head is mounted to head slider 9 through gimbal mechanism 21 so that head support arm unit 22 is constructed. Dimple 8c is arranged on the lower face of head support arm 8 so as to abut on the vicinity of the central portion of head slider 9. When head slider 9 is attached through gimbal mechanism 21, this dimple 8c abuts on about the central portion of gimbal mechanism 21 or the upper face of head slider 9 (the face on the side opposed to the mounting face of the magnetic head). Thus, it is possible to flexibly follow an unnecessary vibration, etc. of a roll or pitch direction with respect to recording medium (not shown in FIG. 3) 4 of head slider 9 at the operating time of the magnetic disk device. Further, voice coil 10 is attached to voice coil holder 23 having hole portion 23a. Balancer 24 is fixedly attached on the side opposed to hole portion 23a through this voice coil 10 so that voice coil section 25 is constructed. Further, voice coil section 25 is fixedly attached to head support arm unit 22 so that actuator subunit 26 is constructed. Head support arm unit 22 and voice coil section 25 are described as separate members. However, the present invention is not limited to this case, but head support arm unit 22 and voice coil section 25 may be also set to one integrated unit.

On the other hand, leaf spring portion 27 as an elastic means is bent at two stages in about a Z-shape and about a ring shape. One end of leaf spring portion 27 is fixedly attached to pivot bearing portion 29 having a pair of pivots 29a, 29b and hole portion 29c through spring fixing member 28 of a semi-annular shape. Leaf spring portion 27 extends through hole portion 8b of head support arm 8. The pair of pivots 29a, 29b of pivot bearing portion 29 abut on the upper face of head support arm 8. The other end of leaf spring portion 27 is fixedly attached to the lower face of head support arm 8. Pivot bearing portion 29 and actuator subunit 26 having head support arm 8 as a constructional element are elastically connected by leaf spring portion 27 as an elastic means through leaf spring portion 27 and the pair of pivots 29a, 29b. Leaf spring portion 27 is operated such that respective abutting points $P_1$ and $P_2$ of the pair of pivots 29a, 29b of pivot bearing portion 29 and the upper face of head support arm 8 are set to fulcrums, and the tab portion 8a side of head support arm 8 constituting actuator subunit 26 is pushed down. Actuator arm 30 is constructed by actuator subunit 26, leaf spring portion 27, spring fixing member 28 and pivot bearing portion 29.

Accordingly, at the operating time of the magnetic disk device, a load of head slider 9, which is applied when head slider 9 attached to head support arm unit 22 through gimbal mechanism 21 is floated with respect to the surface of recording medium 4, is generated by compression stress in the direction of recording medium 4 as a reaction force due to deformation of leaf spring portion 27 with respect to head support arm unit 22 at respective abutting points $P_1$ and $P_2$ of the pair of pivots 29a, 29b of pivot bearing portion 29. Head slider 9 is floated by the relation of a biasing force of the direction of recording medium 4 applied to head slider 9 and a floating force of its reverse direction. Leaf spring portion 27 is then deformed and a constant air gap is held between head slider 9 and recording medium 4, and recording and regenerating operations of the magnetic disk device are performed.

Further, bearing portion 31 of a cylindrical shape with a hollow flange is constructed by flange 31a, screw portion 31b and cylindrical portion 31c. Flange 31a has an outside diameter greater than the inside diameter of hole portion 29c of pivot bearing portion 29 on one end side. Screw portion 31b has an outside diameter smaller than the inside diameter of hole portion 29c of pivot bearing portion 29 on the other end side. Cylindrical portion 31c has an outside diameter fitted to hole portion 29c of pivot bearing portion 29 between flange 31a and screw portion 31b. Bearing portion 31 extends through hole portion 29c of pivot bearing portion 29, the inside of the semi-annular shape of spring fixing member 28, the inside of the annular shape of leaf spring portion 27, and hole portion 23a of voice coil holder 23. Hollow collar 32 has an inside diameter fitted to cylindrical portion 31c from the side opposed to flange 31a, and an outside diameter extending through hole portion 23a of voice coil holder 23. Projecting portion 32a of a semi-annular shape having a shape approximately similar to that of a portion abutting on spring fixing member 28 is arranged in hollow collar 32. Hollow collar 32 is fitted and inserted into cylindrical portion 31c of bearing portion 31 such that its projecting portion 32a is located on the flange 31a side of bearing portion 31. Upper face 32b of projecting portion 32a abuts on an approximately ring planar portion of leaf spring portion 27 fixedly attached to spring fixing member 28. Thus, collar 32 is nipped and supported by flange 31a of bearing portion 31 and nut 33 together with spring fixing member 28 and the planar portion of leaf spring portion 27 fixedly attached and abutting on this spring fixing member 28. Actuator 7 is integrally constructed by actuator arm 30, bearing portion 31, collar 32 and nut 33.

Next, the positions of the pair of pivots 29a, 29b arranged in pivot bearing portion 29 constituting actuator 7 will be explained. Pivots 29a, 29b are formed such that a line connecting respective abutting points $P_1$ and $P_2$ abutting on the upper face of head support arm 8 passes through the axis of rotating shaft 5 of actuator 7 shown in FIG. 1 and is perpendicular to center line 8d of the longitudinal direction of head support arm 8 constituting actuator 7 shown in FIG. 1. It is desirable that abutting points $P_1$ and $P_2$ are arranged so as to be located in positions mutually symmetrical with respect to the axis of rotating shaft 5 of actuator 7, and the middle point of the line connecting abutting points $P_1$ and $P_2$ is approximately conformed to the axis of rotating shaft 5. In accordance with such a construction, actuator subunit 26 constituting actuator 7 can be rotated in a direction perpendicular to the surface of recording medium 4 around the line connecting abutting points $P_1$ and $P_2$ of pivot 29a and pivot 29b. Head support arm 8 constituting actuator subunit 26 is rotated in the counterclockwise direction by the elastic force of leaf spring portion 27. The side of head slider 9 mounted to head support arm 8 is biased in the direction of recording medium 4. It is described that the line connecting abutting points $P_1$ and $P_2$ passes through the axis of rotating shaft 5 of actuator 7 shown in FIG. 1. However, the present invention is not limited to this construction. It is sufficient to set the line connecting abutting points $P_1$ and $P_2$ to be located on a line perpendicular to the plane formed by the axis of rotating shaft 5 and center line 8d of the longitudinal direction of head support arm 8.

Further, the mass (weight) of balancer 24 is set such that the position of gravity center of actuator 7 is approximately conformed to the middle point of the line connecting respective abutting points $P_1$ and $P_2$ of pivot bearing portion 29 abutting on the upper face of head support arm 8 constituting actuator subunit 26. Balancer 24 is fixedly attached to one end of voice coil holder 23 constituting voice coil section 25. Namely, when actuator 7 is constructed, the position of gravity center of actuator 7 is constructed so as to be approximately conformed to the axis of rotating shaft 5 of actuator 7. The position of gravity center of actuator subunit 26 may be also approximately conformed to the axis of rotating shaft 5 as mentioned above. A shift with respect to the gravity center position of actuator 7 is the shift of a degree practically causing no problem. It has been described that balancer 24 is fixedly attached to one end of voice coil holder 23. However, there is also a case in which balancer 24 must be arranged on the head slider 9 side of head support arm unit 22 in accordance with the mass (weight) distribution of respective constructional parts constituting actuator 7.

Head support arm 8 constituting actuator 7 can be formed by a material of high rigidity by constructing actuator 7 as mentioned above. Therefore, the impact resisting property with respect to a large impact from the exterior, etc. is improved, and a resonance frequency of head support arm 8 can be raised. Accordingly, no vibrating mode that has conventionally been a problem is generated, and no settling operation is required. Therefore, actuator 7 can be rotated and positioned at high speed, and an access speed of the magnetic disk device can be improved. Further, leaf spring portion 27 as an elastic means is not integrally formed so as to become one member together with head support arm 8, but is arranged as a separate member independent of head support arm 8. Therefore, the reciprocal request of increasing a load applied to head slider 9 and raising flexibility and further raising the rigidity of a structural body can be independently realized as an operation of each separate constructional element. Accordingly, actuator 7 is easily designed and the degree of freedom of this design can be greatly widened. Further, very precise forming processing of the leaf spring portion as in the conventional head support arm is not required, and the head support arm can be simply formed in comparison with the conventional case. Further, the thickness, material, etc. of leaf spring portion 27 can be independently set. Thus, the strength and spring constant of leaf spring portion 27 can be set to desired predetermined values.

At the stopping time of the operation of the magnetic disk device, a so-called load/unload system (which is abbreviated as a U/UL system in a certain case) for rotating actuator 7 around rotating shaft 5, and moving actuator 7 to the outside of recording medium 4 is used. Here, a holding method in a stopping state of the magnetic disk device will be explained with reference to FIGS. 4 to 6.

In FIGS. 4, 5 and 6, ramp block 15 as a head holding member attached to the chassis or another box body has ramp portion 14 projected in the horizontal direction from the side face of ramp attaching portion 41. One portion of ramp portion 14 is attached such that a clearance is formed between this one portion of ramp portion 14 and the upper side surface of recording medium 4 and this one portion of ramp portion 14 and the upper side surface of recording medium 4 are overlapped in the axial direction of the unillustrated rotation center of recording medium 4. Ramp portion 14 has upper face 43 constructed by first slanting face 14a, first plane 14b, second slanting face 14c, load side wall face 14d, tab portion upper wall face 14g, tab portion holding plane 14e, third slanting face 14h and first head moving plane 14f. Actuator 7 is guided while tab portion 8a of head support arm 8 constituting the above actuator 7 abuts on upper face 43 of ramp portion 14. Here, the above tab portion holding plane 14e is set to have the same meaning as a plane already described as the head holding plane. In the following explanation, tab portion holding plane 14e and the head holding plane mixedly exist, but may be considered to be equal to each other. It can be also said that third slanting face 14h is an unload side wall face with respect to load side wall face 14d.

First plane 14b, tab portion holding plane 14e and first head moving plane 14f in ramp portion 14 are planes respectively approximately parallel to the plane perpendicular to rotating shaft 5 of actuator 7. Load side wall face 14d adjacent to the loading side of actuator 7 with respect to tab portion holding plane 14e is a wall face having an angle of about 90° with respect to tab portion holding plane 14e, and is formed so as to be higher than a holding position of tab portion 8a. Tab portion upper wall face 14g is extended out on the unload side so as to form an angle greater than 90° with respect to load side wall face 14d, and is formed so as to be opposed to tab portion holding plane 14e. Tab portion upper wall face 14g constitutes load side projecting portion 20 together with second slanting face 14c. With respect to tab portion 8a, tab portion upper wall face 14g is formed so as to be wider than the width of tab portion 8a.

When a stopping command is inputted to the magnetic disk device, an electric current is supplied to the voice coil (not shown in FIGS. 4 to 6) in a rotating state of recording medium 4 as it is. Thus, actuator 7 is rotated in the clockwise direction and is moved to the outside of recording medium 4. In the vicinity of the outer circumferential portion of recording medium 4, tab portion 8a of head support arm 8 located at one end of actuator 7 abuts on first slanting face 14a of ramp portion 14. Further, tab portion 8a is sequentially guided to first slanting face 14a, first plane 14b and second slanting face 14c of ramp portion 14 by rotating actuator 7 in the clockwise direction, and is jumped and transferred to first head moving plane 14f. Next, when the rotating command in the unload direction is stopped, tab portion 8a is guided downward and is lowered on third slanting face 14h by the load of gravity. Tab portion 8a is then moved and held in tab portion holding plane 14e as an escaping position. The rotation of recording medium 4 is stopped while actuator 7 guides tab portion 8a on upper face 43 of ramp portion 14, or after the guide to the escaping position.

Next, an explanation will be made with respect to the relation of force in tab portion 8a of actuator 7 and ramp portion 14 when the stopping command is inputted to the magnetic disk device and the rotation of actuator 7 is stopped. When the stopping command is inputted, voice coil 10 rotates actuator 7 in the clockwise direction. Tab portion 8a of actuator 7 is then guided so as to be separated from the surface of recording medium 4 while abutting on upper face 43 of ramp portion 14. At this time, magnetic force according to the Fleming's right-hand law is applied between magnet 11 fixedly attached to upper side yoke 12 and voice coil 10 to which an electric current is supplied to rotate actuator 7 shown in FIG. 1 in the clockwise direction. Electromagnetic force is applied between voice coil 10 of actuator 7 and magnet 11 in accordance with the direction of the electric current supplied to voice coil 10 and the polarity of magnet 11 opposed to voice coil 10 of actuator 7 having tab portion 8a located on the upper face of ramp portion 14. The line connecting abutting points $P_1$ and $P_2$ of pivots 29a, 29b as a joining portion of pivot bearing portion 29 shown in FIGS. 1 and 2 is set to a fulcrum (support axis), and torque intended to rotate actuator 7 around this line is generated. While tab portion 8a of actuator 7 presses against upper face 43 of ramp portion 14, tab portion 8a is guided by upper face 43. Further, actuator 7 is rotated in the clockwise direction by rotating torque around rotating shaft 5 due to the electromagnetic force. Tab portion 8a then passes through second slanting face 14c, and drops from second slanting face 14c by the rotating torque of the direction pressing against the ramp around the pivot, and biasing force additionally applied by leaf spring portion 27 constituting actuator 7. Tab portion 8a then reaches first head moving plane 14f or third slanting face 14h.

When tab portion 8a reaches first head moving plane 14f, a positive electric current is supplied to voice coil 10 and tab portion 8a is slid along third slanting face 14h and is guided to tab portion holding plane 14e. On the other hand, when tab portion 8a drops on third slanting face 14h, downward rotating torque due to the biasing force of leaf spring portion 27 is applied to actuator 7 at a time point at which the electric current supply to voice coil 10 is stopped to stop the rotation of actuator 7. Tab portion 8a is moved downward along the slanting face of third slanting face 14h and enters tab portion holding plane 14e. When tab portion 8a of head support arm 8 constituting actuator 7 then abuts on tab portion holding plane 14e in the escaping position, tab portion 8a presses against tab portion holding plane 14e by biasing force $F_1$ generated by leaf spring portion 27 constituting actuator 7.

Figure 7A:
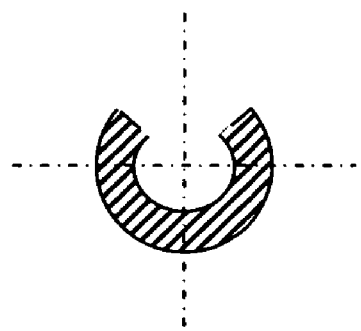
FIG. 7A is a cross-sectional view showing the shape of the tab portion in the embodiment.
Figure 7D:
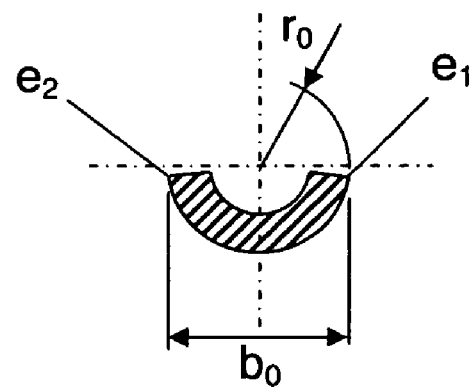
FIG. 7D is a cross-sectional view showing the shape of the tab portion in the embodiment.
Figure 7B:
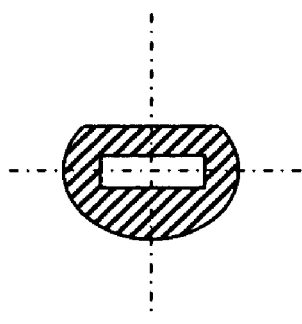
FIG. 7B is a cross-sectional view showing the shape of the tab portion in the embodiment.
Figure 7E:
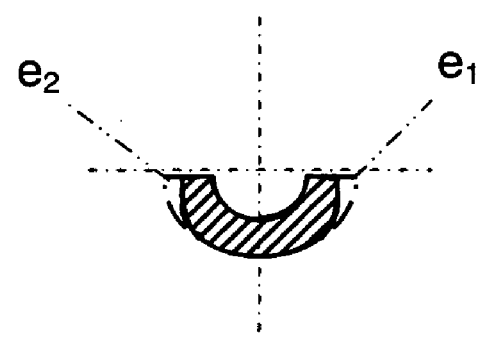
FIG. 7E is a cross-sectional view showing the shape of the tab portion in the embodiment.
Figure 7C:
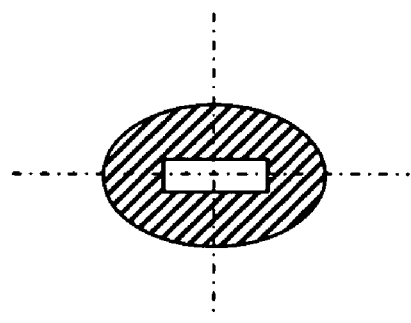
FIG. 7C is a cross-sectional view showing the shape of the tab portion in the embodiment.

Next, the shape of tab portion 8a of head support arm 8, which slides on upper face 43 of ramp portion 14, will be explained. It is necessary to have no engaging portion of an edge, etc. in the outer circumference of at least a half circumference or more in the outer circumferential shape of tab portion 8a so as to slide on first slanting face 14a, first plane 14b, second slanting face 14c, first head moving plane 14f and third slanting face 14h of ramp portion 14. It is desirable to form the outer circumferential shape of tab portion 8a in a cylindrical shape, or a cylindrical shape having a partial circle lunar shape in at least a half circumference or more in section. Further, the outer circumferential shape of tab portion 8a is not limited to the cylindrical shape, but may be also set to an elliptical shape or other shapes. It is sufficient to set the outer circumferential shape of tab portion 8a to a shape having a curved surface smoothly changed. Head support arm 8 having tab portion 8a is normally formed by a material of a plate shape. As shown in FIG. 7A, the tip portion of head support arm 8 may be also processed and formed in the partial circle lunar shape having a cylindrical shape in at least a half circumference or more in its outer circumference by a publicly known processing method of press working, etc. As shown in FIGS. 7B and 7C, the tip portion of head support arm 8 may be also integrally molded by a material of resin, etc. such that the outer shape has the partial circle lunar shape or the cylindrical shape, etc. in tab portion 8a of the plate shape. However, when the outer circumference of tab portion 8a is processed so as to be formed the partial circle lunar shape by the publicly known processing method of press working, etc., a very complicated process is required to perform bending processing so as to form the circle lunar shape in the range of an angle exceeding 180° as shown in FIG. 7A. As shown in FIG. 7D, a shape bent and processed so as to form the partial circle lunar shape in the range of 180° or an angle slightly smaller than 180° is normally formed. Edge processing is desirably performed by polishing processing or laser processing, etc. such that edge portions $e_1$ and $e_2$ shown in FIG. 7D abut on upper face 43 of ramp portion 14 and do not prevent a smooth sliding movement when tab portion 8a is slid on upper face 43 of ramp portion 14, and such that the outer circumferential portion has a smooth face in the vicinity of edge portions $e_1$ and $e_2$ as shown in FIG. 7E.

Subsequently, an explanation will be made with respect to a case in which a very large impact is applied from the exterior to the magnetic disk device by a vibration during carrying conveyance, or dropping, and a collision with another object at the stopping time of the operation of the magnetic disk device.

Linear acceleration and angular acceleration are applied to actuator 7 rotated around rotating shaft 5 by the large impact applied from the exterior to the magnetic disk device. Impact force due to the linear acceleration is applied to the center of gravity of actuator 7, and the magnitude of this impact force depends on the weight of actuator 7. Further, impact force due to the angular acceleration is applied to the center of rotating shaft 5 as a couple of forces, and the magnitude of the couple of forces generated by this impact force depends on the inertia moment of actuator 7.

On the other hand, as mentioned above, first plane 14b and tab portion holding plane 14e in ramp portion 14 are planes respectively approximately parallel to the plane perpendicular to rotating shaft 5 of actuator 7. Load side wall face 14d adjacent to the loading side of actuator 7 with respect to tab portion holding plane 14e is located on a plane having an angle $\theta_1$ of about 90° with respect to tab portion holding plane 14e, and its height is formed so as to be greater than the height of a holding position of tab portion 8a so that tab portion upper wall face 14g is extended out and load side projecting portion 20 is formed. Therefore, with respect to the impact of a disk direction, load side wall face 14d regulates the operation of tab portion 8a, and also regulates the rotation of actuator 7 onto the load side. Further, the width of tab portion upper wall face 14g with respect to tab portion 8a is set to be wider than the width of tab portion 8a. Therefore, with respect to the impact of the upper direction, tab portion upper wall face 14g also regulates the operation of tab portion 8a, and regulates the rotating movement of actuator 7. Accordingly, actuator 7 is not almost rotated with respect to the impact, or is not rotated on the disk side even if actuator 7 is moved.

Further, when the impact of a direction separated from recording medium 4 is applied to actuator 7, third slanting face 14h of ramp portion 14 is formed so as to have an angle of $(180-\theta_2)°$ with respect to tab portion holding plane 14e. Tab portion 8a receiving the impact force of the angular acceleration due to the impact abuts on third slanting face 14h, and relaxes its impact force. Further, even when tab portion 8a is slid and moved in the direction (a slanting right-hand upward direction) for separating actuator 7 from recording medium 4 while abutting on third slanting face 14h, voice coil holder 23 constituting actuator 7 abuts on crush stop 17 arranged in the chassis or the box body and another structural member, and the rotating movement for separating actuator 7 from recording medium 4 is prevented.

Next, an explanation will be made with respect to a case in which an operating command is given to the magnetic disk device, and actuator 7 is moved from tab portion holding plane 14e as the escaping position to the direction of recording medium 4 in the load operation at an operation starting time.

When a negative electric current is supplied to voice coil 10, actuator 7 is rotated by VCM 19 in the unload direction opposed to the disk, and magnetic force according to the Fleming's right-hand law is applied between voice coil 10 and magnet 11. Thus, attraction in the direction of magnet 11 is performed. In contrast to this, when a positive electric current is supplied to voice coil 10, actuator 7 is rotated by VCM 19 in the load direction as the disk direction, and magnetic force according to the Fleming's right-hand law is applied between voice coil 10 and magnet 11. Thus, a repulsive operation in the direction of magnet 11 is performed.

In the above explanation, the rotating direction of VCM 19 and the repulsion and attraction to magnet 11 according to the positiveness and negativeness of the electric current flowed to voice coil 10 have been explained. However, the rotating direction of actuator 7 and the repulsion (attraction) direction in the direction of magnet 11 are determined by the direction of the electric current supplied to voice coil 10 and the polarity of magnet 11 opposed to voice coil 10. Accordingly, effects similar to those of a change in the positiveness and negativeness of the electric current supplied to voice coil 10 are also obtained by changing the polarity of arranged magnet 11.

Figure 8A:
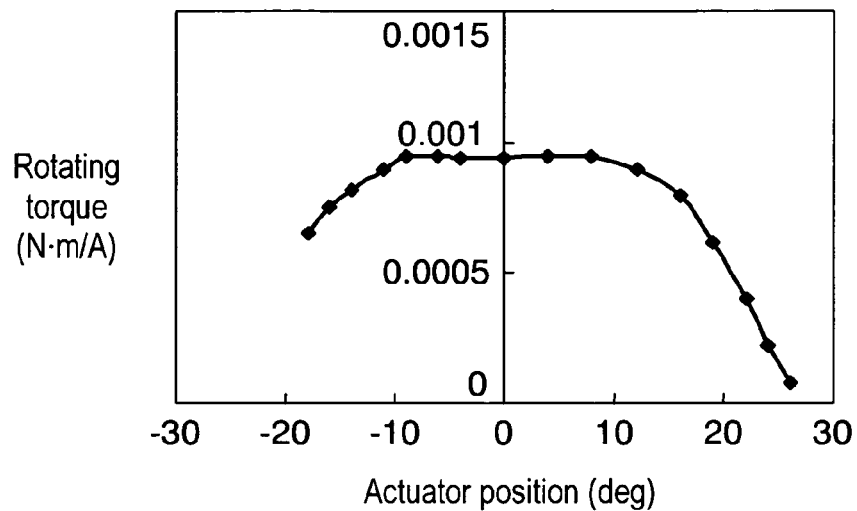
FIG. 8A is a graph showing the relation of the position of a VCM at a VCM driving time and rotating torque of the actuator.
Figure 8B:
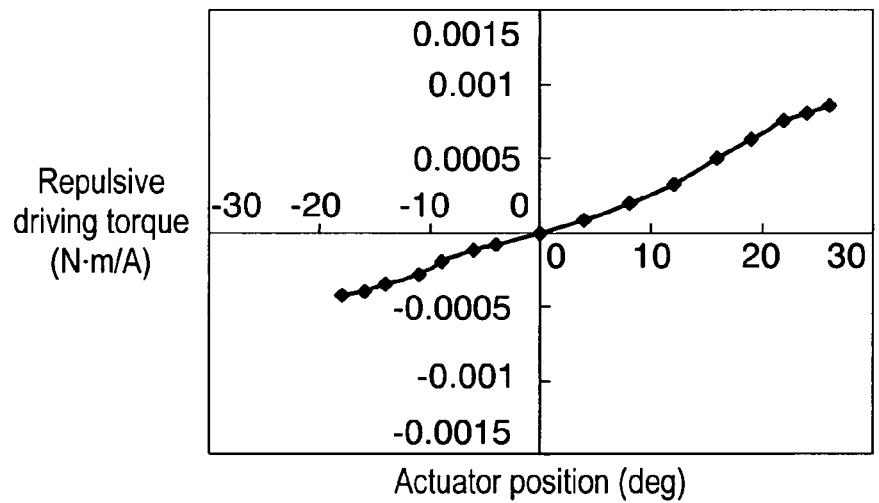
FIG. 8B is a graph showing the relation of the position of the VCM at the VCM driving time and repulsive driving torque applied to the VCM.

Each of FIGS. 8A and 8B shows one example of rotating torque applied to actuator 7 and generated by VCM 19 when a constant electric current is applied to voice coil 10, and repulsive driving torque in the direction reverse to the direction of magnet 11. FIG. 8B shows the repulsive driving torque when the torque of the upward direction is set to be positive in a state in which the positive electric current is applied to VCM 19. In FIGS. 8A and 8B, the position of VCM 19 in actuator 7 is set to an original point of the abscissa axis direction when an unillustrated magnetic head is located in central position 18 of recordable area $R_D$ of recording medium 4 shown in FIG. 1. A rotating angle of VCM 19 provided by setting the escaping position direction of actuator 7 from this position to the +side is set to the abscissa axis. Further, FIG. 9 shows the waveform of a driving electric current flowed to voice coil 10 of VCM 19 of actuator 7. In FIG. 9, the abscissa axis shows time, and the ordinate axis shows the driving electric current.

When an operating command is given to the magnetic disk device, a negative electric current is supplied to voice coil 10. As shown in FIG. 8A, actuator 7 is rotated by the rotating torque of VCM 19 in the direction (unload side) opposed to recording medium 4. As shown in FIG. 8B, the repulsive driving torque of VCM 19 is given to actuator 7 simultaneously with this rotation, and tab portion 8a of head support arm 8 is intended to be moved downward from tab portion holding plane 14e of ramp portion 14. At this time, the rotating torque of VCM 19 generates force intended to move actuator 7 in the direction (on the unload side) opposed to the side of recording medium 4, and horizontal driving force $F_3$ is applied in the direction of third slanting face 14h in tab portion 8a of head support arm 8 constituting actuator 7. Further, the repulsive driving torque of VCM 19 becomes torque intended to rotate actuator 7 around the line connecting abutting points $P_1$ and $P_2$ of pivot 29a and pivot 29b as a joining portion of pivot bearing portion 29 in the direction perpendicular to the surface of recording medium 4. Vertical driving force $F_4$ for pushing tab portion 8a downwards is applied to tab portion 8a. Tab portion 8a is slid upward on third slanting face 14h, and is moved to first head moving plane 14f.

In FIG. 9 showing the waveform of the driving electric current supplied to voice coil 10, a negative electric current is supplied as shown by a and b within FIG. 9, and tab portion 8a begins to be slid. When tab portion 8a is slid upward on first slanting face 14a as an inclining portion, the driving electric current becomes a negative maximum correspondingly to a load increase. Tab portion 8a is then moved from first slanting face 14a as an inclining portion to first plane 14b as a planar portion. Thereafter, the driving electric current is reduced until about 0 (c within FIG. 9), and is rested. Next, a positive electric current is supplied to voice coil 10, and actuator 7 is rotated in the direction (load side) of recording medium 4 by the rotating torque of VCM 19 as shown in FIG. 8A. As shown in FIG. 8B, repulsive driving torque of VCM 19 is given to actuator 7 simultaneously with this rotation, and tab portion 8a of head support arm 8 is intended to be moved upward from tab portion holding plane 14e of ramp portion 14. At this time, the rotating torque of VCM 19 generates force intended to move actuator 7 in the direction (on the load side) of the recording medium 4 side, and horizontal driving force $F_3$ is applied in tab portion 8a of head support arm 8 constituting actuator 7. Further, the repulsive driving torque of VCM 19 becomes torque intended to rotate actuator 7 around the line connecting abutting points $P_1$ and $P_2$ of pivot 29a and pivot 29b as a joining portion of pivot bearing portion 29 in the direction perpendicular to the surface of recording medium 4. Further, vertical driving force $F_4$ intended to raise tab portion 8a upwards is applied to tab portion 8a.

Figure 8C:
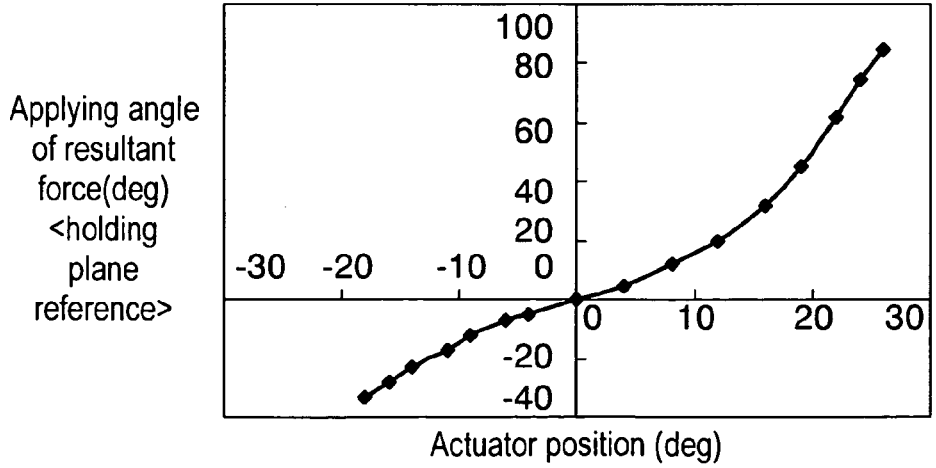
FIG. 8C is a graph showing the relation of the position of the VCM at the VCM driving time and the direction of force applied to the VCM.

FIG. 8C shows the actuator position and the applying direction of the driving force by an angle from the holding plane. In first head moving plane 14f, the actuator position is +26 degrees, and the applying direction of the driving force is +84 degrees. FIG. 10 shows the relation of forces respectively applied by including the above forces $F_3$, $F_4$.

In FIG. 10, biasing force $F_1$ applied to tab portion 8a becomes pressing force with respect to the planar portion. On the other hand, vertical driving force $F_4$ using VCM 19 becomes separating force intended to separate tab portion 8a from load side wall face 14d. Further, horizontal driving force $F_3$ using VCM 19 becomes force for horizontally operating tab portion 8a. Here, the resultant force of two driving forces $F_3$ and $F_4$ applied to tab portion 8a becomes $F_5$ so that the direction and magnitude of force due to the driving force are known. Further, the resultant force of biasing force $F_1$ and resultant force $F_5$ becomes $F_6$. When vertical driving force $F_4$ is greater than biasing force $F_1$, tab portion 8a is separated from the planar portion. Further, the applying direction of the driving force becomes the direction shown by $F_6$. After tab portion 8a is separated from the planar portion, tab portion 8a is jumped in the disk direction and is operated. With respect to the actuator position in first head moving plane 14f and the applying direction of the driving force, the driving force applied in the above actuator position +84 degrees calculated in FIG. 8C is not changed in the vector direction of force and is changed in the magnitude of force by the driving electric current. Accordingly, the driving direction and the driving force are determined by the relation of force with respect to biasing force $F_1$ applied to tab portion 8a. When the driving electric current is increased, tab portion 8a is more highly jumped.

As shown by d within FIG. 9 showing the driving electric current waveform, tab portion 8a is jumped by the positive pulse electric current. As shown by e within FIG. 9, tab portion 8a reaches second slanting face 14c while the positive electric current is applied.

Thereafter, as shown by f, g, h, i within FIG. 9, the electric current is flowed and tab portion 8a is loaded on the disk side (recording medium 4 side) at a constant speed via first plane 14b and first slanting face 14a by controlling the driving electric current in accordance with a contact load of ramp portion 14 and tab portion 8a.

Accordingly, at a starting time of the operation of the disk device, the driving operation is once performed in the direction separated from the disk. Thereafter, repulsive driving torque is generated between magnet 11 and voice coil 10 constituting VCM 19. Torque intended to rotate head support arm 8 around a line passing through the axis of rotating shaft 5 of actuator 7 and perpendicular to center line 8d of the longitudinal direction of head support arm 8 is applied. Force for moving tab portion 8a located in the tip portion of head support arm 8 in the upward direction is generated. Force for rotating actuator 7 around rotating shaft 5 is also generated. Tab portion 8a is jumped from first head moving plane 14f to second slanting face 14c, and actuator 7 is separated from the escaping position onto the disk. Therefore, a sliding movement is made along first plane 14b and first slanting face 14a, and the movement can be easily made in a direction on the surface of recording medium 4.

In the movement of actuator 7 from tab portion holding plane 14e as the escaping position in the direction of recording medium 4 in the load operation at the operation starting time, tab portion 8a is also intended to be slid on the side of recording medium 4 along load side wall face 14d while abutting on load side wall face 14d. At this time, when the sectional shape of tab portion 8a of head support arm 8 constituting actuator 7 is a shape bent and processed so as to form a partial circle lunar shape in the range of 180° or an angle slightly smaller than 180° as shown in the above FIG. 7D, chamfering processing shown by e1, e2 is preferably performed such that no edge portion is overlapped with the load side wall.

As can be understood from FIG. 8B, the repulsive driving torque is large when actuator 7 is located near the escaping position. However, the repulsive driving torque becomes very small when actuator 7 is moved onto recordable area $R_D$ of recording medium 4. Accordingly, it does not badly affect recording and regenerating operations of the magnetic disk device.

The magnetic disk device is constructed by actuator 7, VCM 19 and ramp block 15 mentioned above. Accordingly, even when a large impact is applied from the exterior at the stopping (non-operating) time of the operation of the magnetic disk device, no tab portion 8a of head support arm 8 arranging head slider 9 constituting actuator 7 therein is separated from tab portion holding plane 14e of ramp portion 14 as its escaping position. Further, at the operating time of the magnetic disk device, magnet 11 is arranged on the side opposed to recording medium 4 with respect to actuator 7 arranging voice coil 10 of VCM 19 therein and is opposed to voice coil 10. In accordance with this construction, tab portion 8a is easily separated from tab portion holding plane 14e of ramp portion 14, and actuator 7 is rotated such that head slider 9 is opposed onto the surface of recording medium 4. Thus, the recording and regenerating operations of the magnetic disk device can be performed.

If at least one portion of tab portion 8a is overlapped with tab portion upper wall face 14g, it is effective with respect to the impact in the upward direction, and tab portion upper wall face 14g may be also set to a width overlapped with one portion of tab portion 8a.

The above explanation shows the example of the construction in which ramp block 15 having ramp portion 14 for guiding actuator 7 to the escaping position is arranged in the vicinity of the outer circumferential portion of recording medium 4. However, the present invention is not limited to this construction in the disk device in embodiment 1 of the present invention. As shown in FIGS. 11 and 12, the escaping position 103 of actuator 7 corresponding to the above ramp block 15 is arranged inside the recordable area of recording medium 4, i.e., in the vicinity of rotation center 1 of recording medium 4 by performing attachment to the fixing shaft of a spindle motor when the spindle motor for rotating recording medium 4 is a shaft fixing type, or attachment to a structural member such as the box body, a cover, etc. of the device. Another magnet 105 is arranged on the side of recording medium 4 with respect to actuator 7 arranging voice coil 10 therein. Another voice coil 104 is arranged so as to be opposed to another magnet 105 so that the VCM can be also constructed. Such a construction will next be briefly explained. In FIGS. 11 and 12, the same corresponding elements as FIGS. 1 and 2 are designated by the same reference numerals. However, in this case, the following construction is required. Namely, first slanting face 14a, first plane 14b, second slanting face 14c and load side wall face 14d of ramp portion 14 are arranged on the recordable area side (load side) of recording medium 4 with respect to tab portion holding plane 14e. Third slanting face 14h and first head moving plane 14f are arranged on the rotation center 1 side (i.e., the side opposed to the recordable area, i.e., the unload side in this case) of recording medium 4 with respect to tab portion holding plane 14e. The arranging position of the magnet is arranged on the side of recording medium 4 with respect to actuator 7 arranging voice coil 10 therein, and is opposed to voice coil 10.

In FIG. 11, actuator 7 is constructed from actuator subunit 26, rotating shaft 5 and VCM 119. Actuator subunit 26 arranged in actuator 7 is rotatably pivoted with rotating shaft 5 having a bearing as a center. Actuator subunit 26 can be positioned in a predetermined track position of recording medium 4 by operating VCM 119 as a rotating driving means. VCM 119 as shown in FIG. 11 can be used as the rotating driving means, but bears the rotating movement of head support arm 108 of the direction horizontal to the face of recording medium 4. Further, recording medium 4 can be rotated by a predetermined rotation number around rotating shaft 102 by means of the rotating driving means. For example, a spindle motor can be used as this rotating driving means. Box body 101 holds these members in a predetermined position relation, and seals these members together with an unillustrated cover body. Thus, box body 101 prevents recording medium 4 and the head from being deteriorated by corrosive gas and dust of the exterior. These constructions are similar to those of the magnetic disk device shown in FIG. 1.

The construction of actuator subunit 26 and actuator 7 arranged in the magnetic disk device shown in FIG. 11 will next be explained by using FIG. 12.

In FIG. 12, leaf spring portion 127 constructed by an elastic member, head support arm 108 and arm plate 107 are formed by processing one plate material. Leaf spring portions 127 are arranged on both sides of head support arm 108, and are connected to extending portion 107a of arm plate 107 in their end portions. Leaf spring portion 127 is also connected to the end portion 109 side of head support arm 108. For example, this leaf spring portion 127 and extending portion 107a of arm plate 107 are respectively laser-welded and fixedly attached to base arm 106 in positions shown by U and W. Further, the magnetic disk device has a voice coil section in which the voice coil is fixedly attached to a voice coil holder having a hole portion for inserting rotating shaft 5 on the side opposed to head slider 9 although this construction is not shown in FIG. 12. VCM 119 as the rotating driving means shown in FIG. 11 is constructed together with an upper side yoke, a lower side yoke, an unillustrated magnet, etc. In the magnetic disk device shown in FIG. 11, there is no pivot bearing portion in a portion of rotating shaft 5, and a pivot bearing portion 129 is arranged so as to be located on the head slider 9 side from rotating shaft 5 as shown below.

Pivot bearing portion 129 constructed by a pair of pivots 129a, 129b is arranged in base arm 106. A rotating bearing portion pivoted in the perpendicular direction of the recording medium is constructed by this pivot bearing portion 129. Head support arm 108 abuts on pivot bearing portion 129 as the rotating bearing portion, and is elastically held through leaf spring portion 127, and can be rotated in only the direction perpendicular to the surface of recording medium 4. As shown in FIG. 12, the pair of pivots 129a, 129b of pivot bearing portion 129 as the rotating bearing portion abut on head support arm 108 at abutting points $P_1$ and $P_2$ of two places of head support arm 108. Accordingly, one end side fixing head slider 9 arranged in head support arm 108 is biased in the surface direction (the direction of center line 10a shown in FIG. 1) of recording medium 4 by the elastic force of leaf spring portion 127. At this time, compression stress is generated at abutting points $P_1$ and $P_2$. A line connecting these abutting points $P_1$ and $P_2$ becomes a rotating axis in the direction perpendicular to the surface of recording medium 4.

In end portion 109 on the side opposed to one end fixedly attaching head slider 9 thereto with the rotating bearing portion as a reference in head support arm 108, a separate magnet 105 is fixedly attached to the face of the opposite side. Another voice coil 104 is arranged so as to be opposed to this separate magnet 105 so that separate VCM 119 is constructed. The rotation of head slider 9 arranged at one end of head support arm 108 in the direction perpendicular to the surface of recording medium 4 is controlled by this separate VCM 119. As shown in FIG. 12, respective pivots 129a, 129b of pivot bearing portion 129 as the rotating bearing portion are arranged on a line perpendicular to center line 10a of the longitudinal direction of head support arm 108 in positions symmetrical with respect to this center line 10a. Accordingly, biasing force applied to head slider 9 at the operating time of the magnetic disk device, i.e., in a floating state of head slider 9 with respect to recording medium 4 is generated by compression stress with respect to head support arm 108 using each of pivots 129a, 129b of pivot bearing portion 129. However, biasing force using the elasticity of leaf spring portion 127 is controlled so as to balance with driving force of the VCM constructed by arranging the separate voice coil 104 oppositely to the separate magnet 105.

With respect to the escaping position 103 (corresponding to ramp block 15 shown in FIGS. 1 and 4) of actuator 7 arranged inside the recordable area of recording medium 4 shown in FIG. 11, i.e., in the vicinity of rotation center 1 of recording medium 4, its structure, construction, etc. are essentially similar to the contents explained in FIGS. 1 to 10, and their explanations are therefore omitted to avoid overlapping.

Figure 13A:
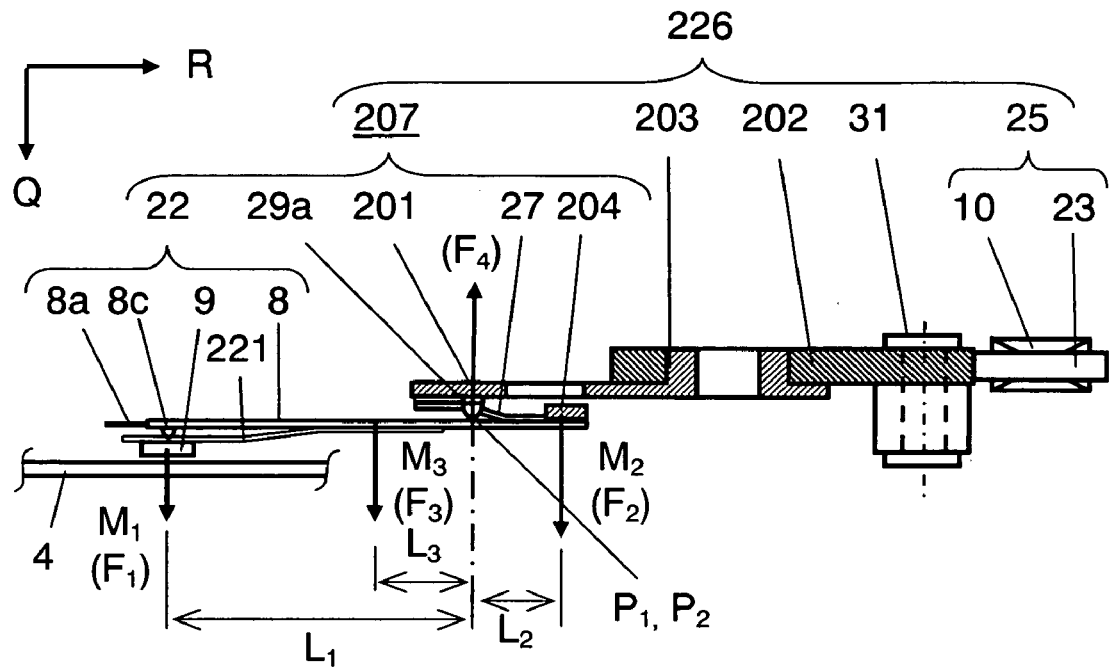
FIG. 13A is a side view showing a separate construction of the actuator arranged in the magnetic disk device in embodiment 1 of the present invention.
Figure 13B:
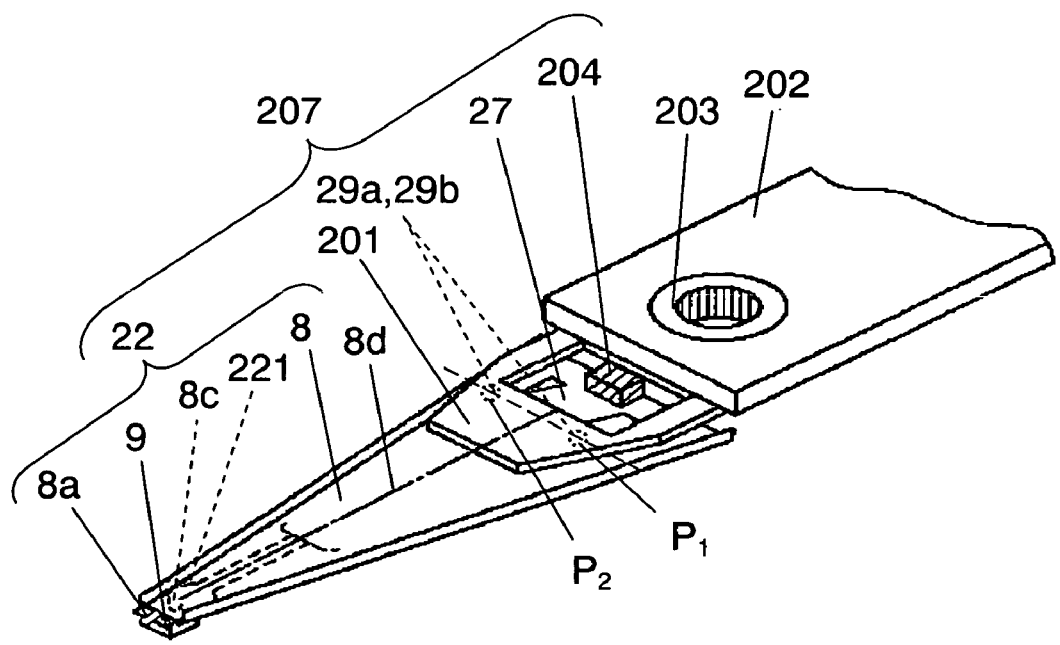
FIG. 13B is a partial perspective view of the actuator shown in FIG. 13A.

In the above embodiment of the present invention, as shown in FIGS. 2 and 3, the explanation has been made by the construction in which rotating shaft 5 as a first rotating shaft of bearing portion 31 as a first bearing, and the line passing through abutting points $P_1$ and $P_2$ as a second rotating shaft using pivots 29a, 29b as a joining portion of pivot bearing portion 29 as a second bearing are directly perpendicular to each other. However, the embodiment of the present invention is not limited to this construction. For example, a base arm fixedly attached to bearing portion 31 as the first bearing at one end is arranged. A joining portion of pivot bearing portion 129 as the second bearing is arranged on the other end side of this base arm. If the other end of the base arm and head support arm 8 are fixedly attached by leaf spring portion 27, it is possible to set a construction for arranging the second rotating shaft in a position separated from the first rotating shaft. In this case, differing from the construction in which the first rotating shaft and the second rotating shaft explained by using FIGS. 2 and 3 are perpendicular, a construction for perpendicularly setting a face having the first rotating shaft and a face having the second rotating shaft is set. FIG. 13 shows an example of such a construction. FIG. 13A is a side view showing a separate construction of the actuator arranged in the magnetic disk device in the embodiment of the present invention. FIG. 13B is a partial perspective view of the actuator shown in FIG. 13A. In FIG. 13, the same corresponding elements as FIGS. 2 and 3 are designated by the same reference numerals.

In the following description, a brief explanation will be made with respect to an example of a construction in which the first rotating shaft and the second rotating shaft shown in FIGS. 13A and 13B are not directly perpendicular. In FIGS. 13A and 13B, head support arm 8 has tab portion 8a in one end portion thereof. In this head support arm 8, dimple 8c is arranged on the lower face of head support arm 8 so as to abut on the vicinity of the central portion of head slider 9. Head slider 9 mounting an unillustrated magnetic head thereto is arranged through gimbal mechanism 21 so that head support arm unit 22 is constructed. Gimbal mechanism 21 has been already explained in the constructions shown in FIGS. 2 and 3, and its explanation is therefore omitted to avoid overlapping.

On the other hand, one end of leaf spring portion 27 as an elastic means bent at two stages approximately in a Z-shape in section is fixedly attached to the upper face of the other end side of head support arm 8 and the lower face of first base arm 201 constituting a pivot bearing. Head support arm 8 and first base arm 201 constituting the pivot bearing are elastically connected. A pair of pivots 29a, 29b are formed on the lower face of the vicinity of leaf spring portion 27 of first base arm 201 constituting the pivot bearing. The pair of pivots 29a, 29b become a joining portion of pivot bearing portion 29, and respectively abut on the upper face of head support arm 8 at abutting points $P_1$ and $P_2$. Leaf spring portion 27 is operated so as to push-down the tab portion 8a side of head support arm 8 with abutting points $P_1$ and $P_2$ as fulcrums. First base arm 201 constituting the pivot bearing is fixedly attached and joined to joining portion 203 constructed by e.g., a projecting portion of a hollow cylindrical shape, etc. for integration with second base arm 202 formed on the side opposed to the joining portion of leaf spring portion 27. Further, the mass (weight) of balancer 204 is set such that the gravity center of head support arm unit 22 arranging head slider 9 therein is approximately conformed to a middle point of the line connecting respective abutting points $P_1$ and $P_2$ of the joining portion of pivot bearing portion 29 abutting on the upper face of head support arm 8. Balancer 204 is fixedly attached to one end of head support arm 8. Further, voice coil holder 23 attaching voice coil 10 thereto is fixedly attached to the other end of second base arm 202, and constitutes voice coil section 25.

Actuator 226 is constructed by the above explained members, i.e., head support arm 8 constituting head support arm unit 22, first base arm 201, second base arm 202 connected to first base arm 201 constituting the pivot bearing, and voice coil section 25 fixedly attached to second base arm 202. First base arm 201 has the pair of pivots 29a, 29b as the joining portion of pivot bearing portion 29, and constitutes the pivot bearing connected to head support arm 8 by leaf spring portion 27. Second base arm 202 and voice coil section 25 are described as separate members, but may be also set to one integrated unit.

Pressing force for pressing against the surface of recording medium 4 by the above head slider 9 can be arbitrarily set in accordance with the material and thickness of leaf spring portion 27, the heights until respective abutting points $P_1$ and $P_2$ of the pair of pivots 29a, 29b, and the position of the connecting portion or the fixedly attaching portion of head support arm 8 and leaf spring portion 27. For example, large biasing force can be applied by thickly forming leaf spring portion 27 by a material of high rigidity. Otherwise, large biasing force can be also applied even when the heights of vertexes of the pair of pivots 29a, 29b are highly set.

Next, the above balancer 204 will be explained. The second rotating axis connecting respective abutting points $P_1$ and $P_2$ of the pair of pivots 29a, 29b arranged in first base arm 201 constituting the pivot bearing is set to a reference, and the distance until the gravity center of head slider 9 is set to $L_1$. The distance until the gravity center of balancer 204 is set to $L_2$. The mass of head slider 9 is set to $M_1$. The mass of balancer 204 is set to $M_2$. A total mass provided by adding the mass of a rotating portion of head support arm 8 and the mass of flexure 221 is set to $M_3$. The distance until the gravity center to which the total mass provided by adding the mass of the rotating portion of head support arm 8 and the mass of flexure 221 is applied is set to $L_3$. In this case, mass $M_2$ of balancer 204 is set so as to satisfy the following (formula 1).

$$L_1 \times M_1 + L_3 \times M_3 = L_2 \times M_2 \tag{formula 1}$$

When the respective gravity centers of head slider 9, flexure 221, the rotating portion of head support arm 8, and balancer 204 in actuator subunit 207 are set in this way, it is possible to prevent head slider 9 from colliding with recording medium 4 even when impact force is applied. For example, it is supposed that the impact force is applied in the direction shown by Q in FIG. 13. Impact force $F_i$ proportional to mass $M_1$ is applied to head slider 9. Impact force $F_6$ proportional to mass $M_2$ is applied to balancer 204. Further, impact force $F_7$ proportional to its total mass $M_3$ is applied to the rotating portion of head support arm 8 and flexure 221.

Actuator subunit 207 is set so as to satisfy (formula 1). Accordingly, with respect to these impact forces, the relation shown by the following (formula 2) is formed.

$$L_1 \times F_5 + L_3 \times F_7 = L_2 \times F_6 \quad \text{(formula 2)}$$

As this result, even when the impact from the exterior is applied, no rotating force around the second rotating axis connecting respective abutting points $P_1$ and $P_2$ of the pair of pivots 29a, 29b of first base arm 201 constituting pivot bearing portion 29 is generated in actuator subunit 207. Accordingly, it is possible to prevent that head slider 9 collides with the surface of recording medium 4, and the unillustrated magnetic head mounted to head slider 9 and recording medium 4 are damaged. Namely, if the gravity center of actuator subunit 207 is designed so as to be substantially located in the same position as unillustrated middle point P on the line connecting respective abutting points $P_1$ and $P_2$ of the pair of pivots 29a, 29b of first base arm 201 constituting pivot bearing portion 29 and head support arm 8, it is possible to realize actuator 226 constituting actuator subunit 207 having a small vibration and stable with respect to the impact from the exterior, etc. When the gravity center position of actuator subunit 207 is conformed to the above middle point P, actuator subunit 207 having a greatest impact resisting property can be realized. However, if the gravity center position is located on the line connecting respective abutting points $P_1$ and $P_2$ of the pair of pivots 29a, 29b of first base arm 201 constituting pivot bearing portion 29, it is possible to realize actuator subunit 207 having a practically sufficient impact resisting property even when the gravity center position is shifted from middle point P.

Force applied between actuator subunit 207 and respective abutting points $P_1$ and $P_2$ of the pair of pivots 29a, 29b of first base arm 201 constituting pivot bearing portion 29 is set to $F_8$. In this case, if the relation of the following (formula 3) is satisfied, $$F_5 + F_6 + F_7 > F_8 \quad \text{(formula 3)}$$

two pivots 29a, 29b of first base arm 201 and actuator subunit 207 are separated. However, if the relation of the following (formula 4) is satisfied, $$F_5 + F_6 + F_7 \leq F_8 \quad \text{(formula 4)}$$

two pivots 29a, 29b of first base arm 201 constituting pivot bearing portion 29 and actuator subunit 207 are not separated. Force $F_8$ satisfying such a condition is generated by internal stress generated from rotation moment generated by leaf spring portion 27 of head support arm 8. However, this force can be arbitrarily set as mentioned above. Accordingly, even when the impact force is applied, it is also easy to set two pivots 29a, 29b of first base arm 201 constituting pivot bearing portion 29 and actuator subunit 207 not to be separated from each other.

Further, no rotation moment is generated in actuator subunit 207 if it is constructed such that the gravity center of actuator subunit 207 is also conformed to the second rotating axis connecting respective abutting points $P_1$ and $P_2$ of two pivots 29a, 29b of first base arm 201 constituting pivot bearing portion 29 with respect to the impact force in the direction shown by R in FIG. 13, i.e., the direction parallel to the surface of recording medium 4. Accordingly, it is possible to restrain head slider 9 from colliding with recording medium 4.

Accordingly, when head slider 9 attached to head support arm unit 22 through flexure 221 is floated with respect to the surface of recording medium 4 at the operating time of the magnetic disk device, the load of head slider 9 is generated by compression stress in the direction of recording medium 4 as reaction force due to deformation of leaf spring portion 27 with respect to head support arm unit 22 at respective abutting points $P_1$ and $P_2$ of the pair of pivots 29a, 29b of the joining portion of pivot bearing portion 29. Head slider 9 is floated by the relation of the biasing force of the recording medium 4 direction applied to head slider 9 and the floating force of its reverse direction. Leaf spring portion 27 is then deformed and the recording and regenerating operations of the magnetic disk device are performed by holding a constant gap between head slider 9 and recording medium 4. Such operations are similar to those in the above case of FIGS. 2 and 3.

Next, the positions of the pair of pivots 29a, 29b arranged in the joining portion of pivot bearing portion 29 will be again explained. The line connecting respective abutting points $P_1$ and $P_2$ at which pivot 29a and pivot 29b abut on the upper face of head support arm 8, is formed so as to be perpendicular to center line 8d of the longitudinal direction of head support arm 8. Further, center line 8d of the longitudinal direction of head support arm 8 is formed so as to be perpendicular to the axis of the first rotating shaft of bearing portion 31. In accordance with such a construction, actuator subunit 207 can be rotated in the direction perpendicular to the surface of recording medium 4 around the line connecting respective abutting points $P_1$ and $P_2$ of the pair of pivots 29a, 29b. Head support arm 8 constituting actuator subunit 207 is rotated in the counterclockwise direction by the elastic force of leaf spring portion 27, and the side of head slider 9 mounted to head support arm 8 is biased in the direction of recording medium 4. It is sufficient to locate the line connecting abutting points $P_1$ and $P_2$ on the line perpendicular to the plane formed by the axis of the first rotating shaft of bearing portion 31 and center line 8d of the longitudinal direction of head support arm 8. It is desirable to arrange abutting points $P_1$ and $P_2$ so as to be located in positions mutually symmetrical with respect to center line 8d.

The ramp portion and the crush stop are not shown in actuator 226 explained by using FIG. 13. The ramp portion guides actuator 226 in the unload operation, and guides tab portion 8a to the escaping position. The crush stop makes a collision of voice coil holder 23 of voice coil section 25 for restraining excessive rotation of actuator 226 when an emergency stopping command is inputted by an external factor such as an impact, etc. However, in the magnetic disk device in the embodiment of the present invention, the ramp portion and the crush stop shown in FIGS. 1 and 4 to 7 can be adapted as they are even in actuator 226 in which the first bearing (bearing portion 31) and the second bearing (pivot bearing portion) are separated. Therefore, explanations about the constructions and operations of the ramp portion and the crush stop are omitted to avoid overlapping.

Actuator 226 shown in FIG. 13A is constructed such that the base arm is divided into first base arm 201 and second base arm 202 constituting pivot bearing portion 29, and is fixedly attached and joined by joining portion 203. However, in addition to such a constructional example, for example, it is also possible to set a construction in which the hole portion of joining portion 203 of first base arm 201 constituting pivot bearing portion 29 is fitted to bearing portion 31, and first base arm 201 and second base arm 202 constituting pivot bearing portion 29 are set to an integrated base arm.

Figure 14A:
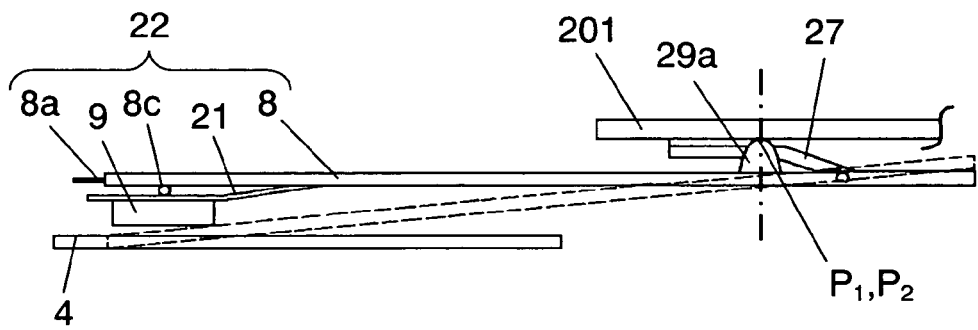
FIG. 14A is a partial side view showing a separate construction of the actuator arranged in the magnetic disk device in embodiment 1 of the present invention.
Figure 14B:
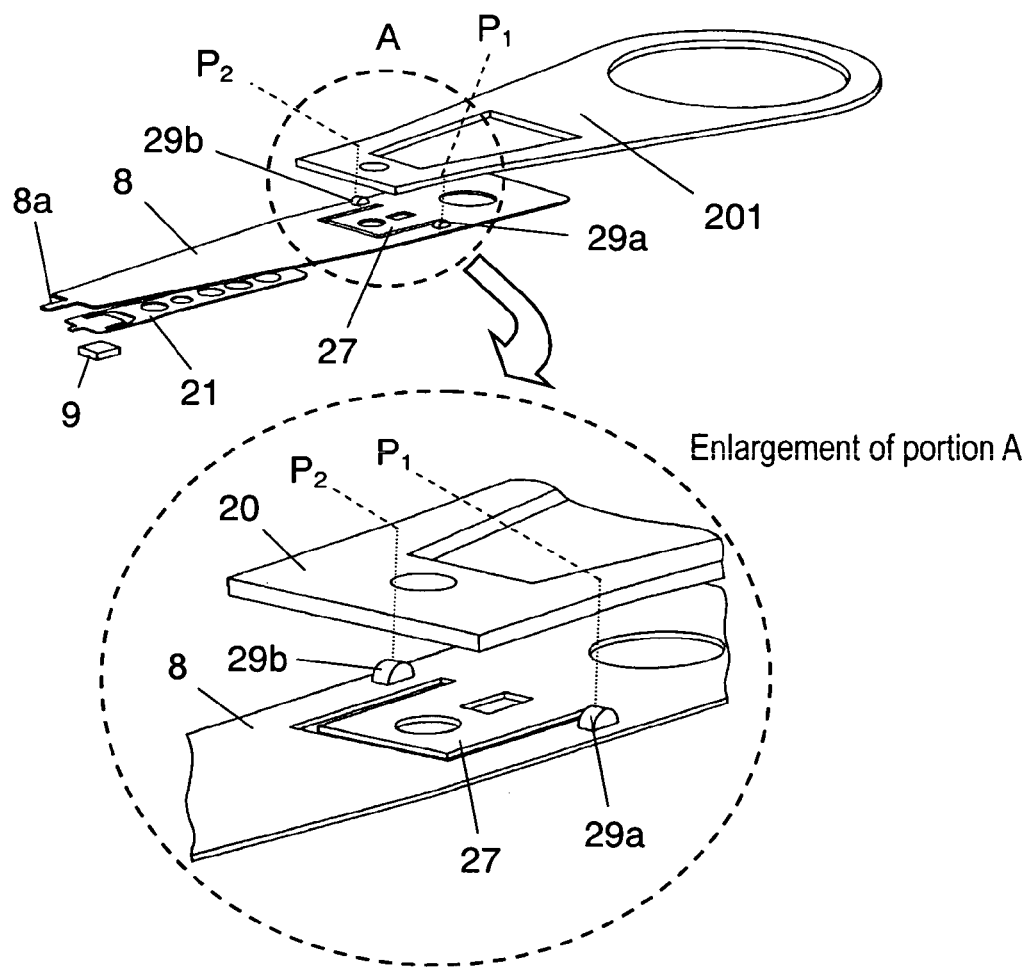
FIG. 14B is an exploded perspective view of the actuator shown in FIG. 14A.

Further, in the example shown in the above FIGS. 13A and 13B, the pair of pivots 29a, 29b of pivot bearing portion 29 are constructed so as to abut on the upper face of head support arm 8 at respective abutting points $P_1$ and $P_2$. However, as shown in FIG. 14, it may be also constructed such that the pair of pivots 29a, 29b are formed on the side of head support arm 8, and abut on the lower face of first base arm 201 at respective abutting points $P_1$ and $P_2$. FIG. 14A is a partial side view showing another construction of the actuator arranged in the magnetic disk device in the embodiment of the present invention as an example of the construction for forming pivots 29a, 29b on the side of head support arm 8. FIG. 14B is an exploded perspective view of the actuator shown in FIG. 14A. In FIGS. 14A and 14B, the same corresponding elements as FIGS. 13A and 13B are designated by the same reference numerals.

The construction of FIG. 14A differs from the construction of actuator 226 shown in FIG. 13A in only the following construction. Namely, second base arm 202, bearing portion 31 and voice coil section 25 are omitted. The pair of pivots 29a, 29b of pivot bearing portion 29 as the second bearing are formed on the other end side of head support arm 8 having tab portion 8a in one end portion. Further, the lower face of first base arm 201 and the pair of pivots 29a, 29b abut at abutting points $P_1$ and $P_2$. The other constructions and operating methods, etc. are the same as actuator 226 shown in FIG. 13A, and their explanations are therefore omitted to avoid overlapping.

In the above explanation, the shapes of pivots 29a, 29b are not mentioned, but may be set to a shape abutting on first base arm 201 or head support arm 8 at the abutting points as in a cone, a polygonal cone, a hemisphere, a semi-elliptical body, etc. Further, pivots 29a, 29b can be also abutted on a line by utilizing the ridgeline of a polyhedral body as well as a semi-circular column and a semi-elliptical column as a so-called semicylindrical shape. FIG. 14B shows an example of pivots 29a, 29b utilizing the semi-circular column.

Further, in the embodiment of the present invention, the construction for forming the pivot on the side of head support arm 8 can be naturally adaptively set to a construction in which the first rotating shaft and the second rotating shaft are integrated and set to an integrated rotating bearing as shown in FIGS. 1, 2 and 3 as well as the construction shown in FIG. 14.

In the construction shown in FIG. 14, the ramp portion and the crush stop are also not shown. The ramp portion guides the actuator in the unload operation, and guides tab portion 8a to the escaping position. The crush stop makes a collision of the unillustrated voice coil holder of the voice coil section for restraining the excessive rotation of the actuator when an emergency stopping command is inputted by an external factor such as an impact, etc. However, in the magnetic disk device in the embodiment of the present invention, the ramp portion and the crush stop shown in FIGS. 1 and 4 to 7 can be naturally adapted as they are even in the actuator having the construction in which the pair of pivots 29a, 29b of pivot bearing portion 29 are formed on the other end side of head support arm 8 having tab portion 8a in one end portion, and the pair of pivots 29a, 29b abut on the lower face of first base arm 201 at abutting points $P_1$ and $P_2$.

As explained above, in accordance with embodiment 1 of the present invention, the degree of freedom of design of the actuator is greatly enlarged, and the head support arm constituting the actuator is formed by a material of high rigidity so that the impact resisting property with respect to a large impact from the exterior, etc. is improved. Further, the load with respect to the head slider assembled into the actuator can be increased. A high impact resisting property is provided with respect to a vibration or the impact from the exterior during the operation of the disk device. A resonance frequency of the head support arm can be also raised. Further, the actuator can be rotated and positioned at high speed. It is possible to realize an excellent actuator having a high access speed. Further, at the stopping time (non-operating time) of the operation of the magnetic disk device, i.e., when the actuator is held in the escaping position, the angle formed between the load side wall face and the head holding plane is set to 90° or less, and the head upper wall face described as tab portion upper wall face 14g is arranged so that the movement of the actuator to the disk side with respect to a large impact from the exterior can be prevented.

On the other hand, with respect to the impact of the reverse direction, the load side wall face of the above ramp portion or the crush stop prevents the movement of the tab portion of the head support arm constituting the actuator. The tab portion can be held on the head holding plane of the ramp portion as the escaping position of the actuator. Accordingly, it is possible to realize an excellent disk device of a high impact resisting property able to hold the actuator in the escaping position by a simple construction.

Embodiment 2

Figure 15:
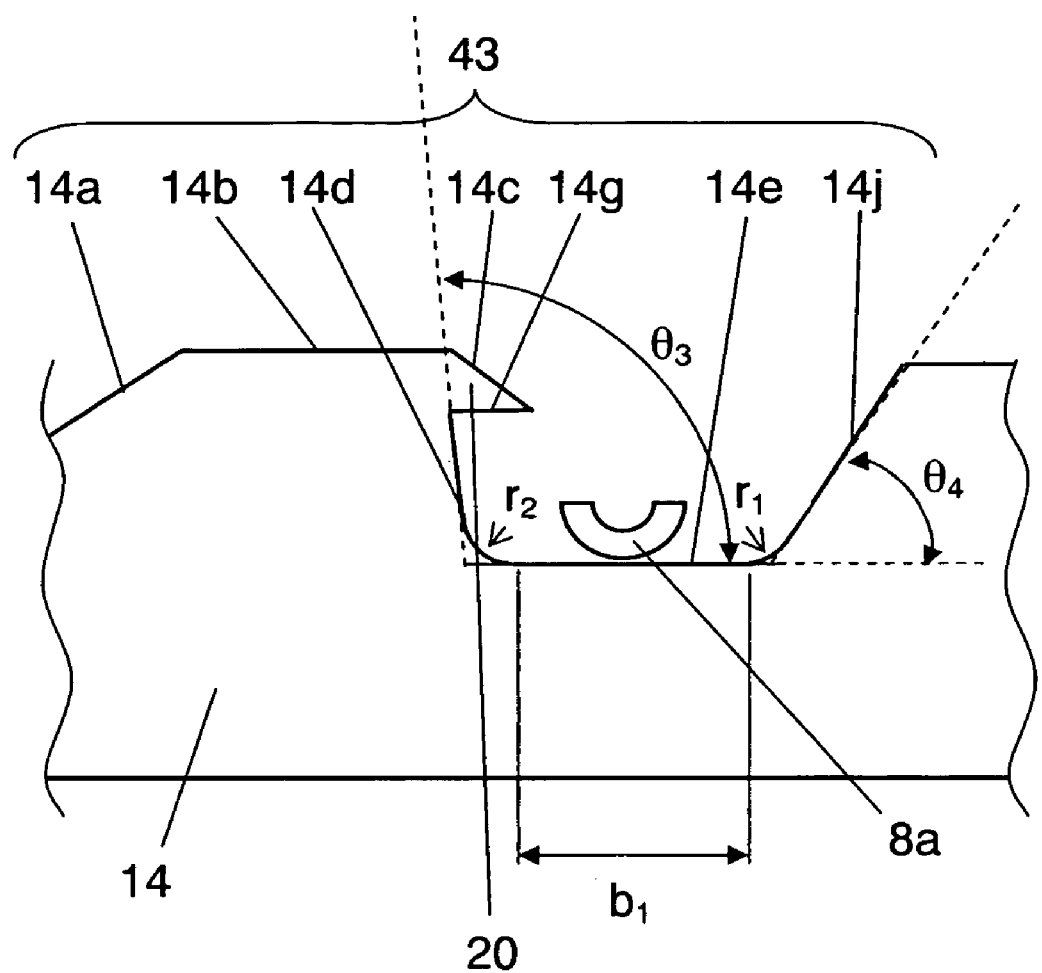
FIG. 15 is a partial enlarged sectional view showing the vicinity of a head holding plane of a ramp portion as an escaping position of an actuator arranged in a magnetic disk device in embodiment 2 of the present invention.

FIG. 15 is a partial enlarged sectional view showing the vicinity of the head holding plane of the ramp portion as the escaping position of the actuator arranged in the disk device in embodiment 2 of the present invention. A holding method of the actuator with respect to the ramp portion of the disk device in embodiment 2 of the present invention will next be explained. The construction of the actuator arranged in the disk device in embodiment 2 of the present invention is about the same as the construction in embodiment 1 shown in FIGS. 1 to 4. Accordingly, these figures are also referred in the explanation. Further, in FIG. 15, the same constructional elements as embodiment 1 are designated by the same reference numerals to avoid overlapping.

In FIGS. 4 and 15, ramp block 15 as the head holding member attached to the chassis or a separate box body has ramp portion 14 projected in the load side horizontal direction from the side face of ramp attaching portion 41. One portion of ramp portion 14 is attached so as to be overlapped by forming a clearance between this one portion of ramp portion 14 and the upper side surface of recording medium 4 in the axial direction of the unillustrated rotation center of recording medium 4. Ramp portion 14 has a face constructed by first slanting face 14a, first plane 14b, second slanting face 14c, tab portion upper wall face 14g, load side wall face 14d, tab portion holding plane 14e and unload side wall face 14j. Actuator 7 is guided while tab portion 8a of head support arm 8 constituting the above actuator 7 abuts on upper face 43 of ramp portion 14.

Tab portion holding plane 14e and load side wall face 14d are connected so as to form a curved surface having curvature radius $r_2$ approximately equal to curvature radius $r_0$ (see FIG. 7D) of a partial circle lunar shape of tab portion 8a in each crossing portion of tab portion holding plane 14e and load side wall face 14d. Further, unload side wall face 14j and tab portion holding plane 14e are also connected by a face having curvature radius $r_1$ approximately equal to curvature radius $r_0$.

First plane 14b and tab portion holding plane 14e in ramp portion 14 are planes respectively approximately parallel to the plane perpendicular to the rotating axis of actuator 7. Load side wall face 14d adjacent to the loading side of actuator 7 with respect to tab portion holding plane 14e is constructed by a plane having angle $\theta_3$ of about 100° with respect to tab portion holding plane 14e, and has a height greater than at least the axial height of the rotating shaft in tab portion 8a. Further, load side wall face 14d is formed so as to be adjacently connected to tab portion upper wall face 14g having a width of about ½ of the tab width. In ramp portion 14 arranged in the disk device in embodiment 2 of the present invention, load side projecting portion 20 is also formed by second slanting face 14c and tab portion upper wall face 14g. Unload side wall face 14j is set to have angle $\theta_4$ smaller than 90° with respect to tab portion holding plane 14e.

Linear acceleration and angular acceleration are applied to actuator 7 rotated around the rotating axis by an impact from the exterior applied to the magnetic disk device. If the direction of impact force due to the linear acceleration applied to the gravity center of actuator 7 and depending on the weight of actuator 7 in its magnitude is the direction of load side wall face 14d, load side wall face 14d has angle $\theta_2$ of about 100° with respect to tab portion holding plane 14e and the loading side. Therefore, no movement is made on the disk (recording medium 4) side (load direction side), and no tab portion 8a is moved until the side of recording medium 4.

Further, with respect to the upward impact of actuator 7, one portion of tab portion 8a comes in contact with tab portion upper wall face 14g (i.e., load side projecting portion 20) and is held. Accordingly, it is possible to prevent that actuator 7 is rotated on the side of recording medium 4 with respect to the impact and head slider 9 is jumped out onto recording medium 4.

When actuator 7 receives the impact of the direction (unload direction) separated from recording medium 4 and tab portion 8a of head support arm 8 arranged in actuator 7 is intended to be slid on unload side wall face 14j on the direction side separated from recording medium 4, and the sectional shape of tab portion 8a of head support arm 8 constituting actuator 7 is a shape bent and processed so as to be formed in a partial circle lunar shape as shown in the above FIG. 7D, a shape for connecting tab portion holding plane 14e and unload side wall face 14j may be also set so as to have curvature radius $r_1$ approximately equal to or greater than curvature radius $r_0$ (see FIG. 7D) of the outer shape of the partial circle lunar shape of tab portion 8a in a crossing portion of unload side wall face 14j with respect to tab portion holding plane 14e and load side wall face 14d with respect to tab portion holding plane 14e. The contact face of tab portion 8a and upper face 43 of ramp portion 14 is enlarged by setting the shape connected by a face having such curvature, and contact stress due to pressing of tab portion 8a is reduced. Accordingly, wear of ramp portion 14 can be reduced. Further, tab portion holding plane 14e is desirably formed such that width $b_1$ of tab portion holding plane 14e of the direction perpendicular to the rotation center of the rotating shaft of actuator 7 has a width approximately equal to or greater than width $b_0$ (see FIG. 7D) of tab portion 8a in the same direction.

Further, as shown in FIG. 15, a shape for connecting tab portion holding plane 14e and load side wall face 14d may be also set so as to become a curved surface formed by a curve having curvature radius $r_2$ approximately equal to curvature radius $r_0$ (see FIG. 7D) of the partial circle lunar shape of tab portion 8a at the intersecting point of tab portion holding plane 14e and load side wall face 14d.

In the disk device in embodiment 2 of the present invention mentioned above, the explanations of VCM 19 constructed by voice coil 10 and magnet 11 constituting actuator 7, and pivot bearing portion 29 having the pair of pivots 29a, 29b as the joining portion, etc. are omitted. However, the construction of the disk device in embodiment 1 can be approximately similarly adapted.

As explained above, in accordance with embodiment 2 of the present invention, the degree of freedom of design of the actuator is greatly enlarged and the head support arm constituting the actuator is formed by a material of high rigidity so that the impact resisting property with respect to a large impact from the exterior, etc. is improved. Further, the load with respect to the head slider assembled into the actuator can be increased. A high impact resisting property with respect to a vibration or the impact from the exterior during the operation of the disk device is provided. A resonance frequency of the head support arm can be also raised. Further, the actuator can be rotated and positioned at high speed, and an excellent actuator having a high access speed can be realized. Further, at the stopping time (non-operating time) of the operation of the magnetic disk device, i.e., when the actuator is held in the escaping position and the angle formed between the load side wall face and the head holding plane is set to 90° or more, it is possible to prevent the actuator from being moved on the disk side with respect to a large impact from the exterior by arranging the head upper wall face described as the tab portion upper wall face. Further, the tab portion can be held on the head holding plane of the ramp portion as the escaping position of the actuator. Accordingly, it is possible to realize an excellent disk device of a high impact resisting property able to hold the actuator in the escaping position by a simple construction.

Embodiment 3

Figure 16:
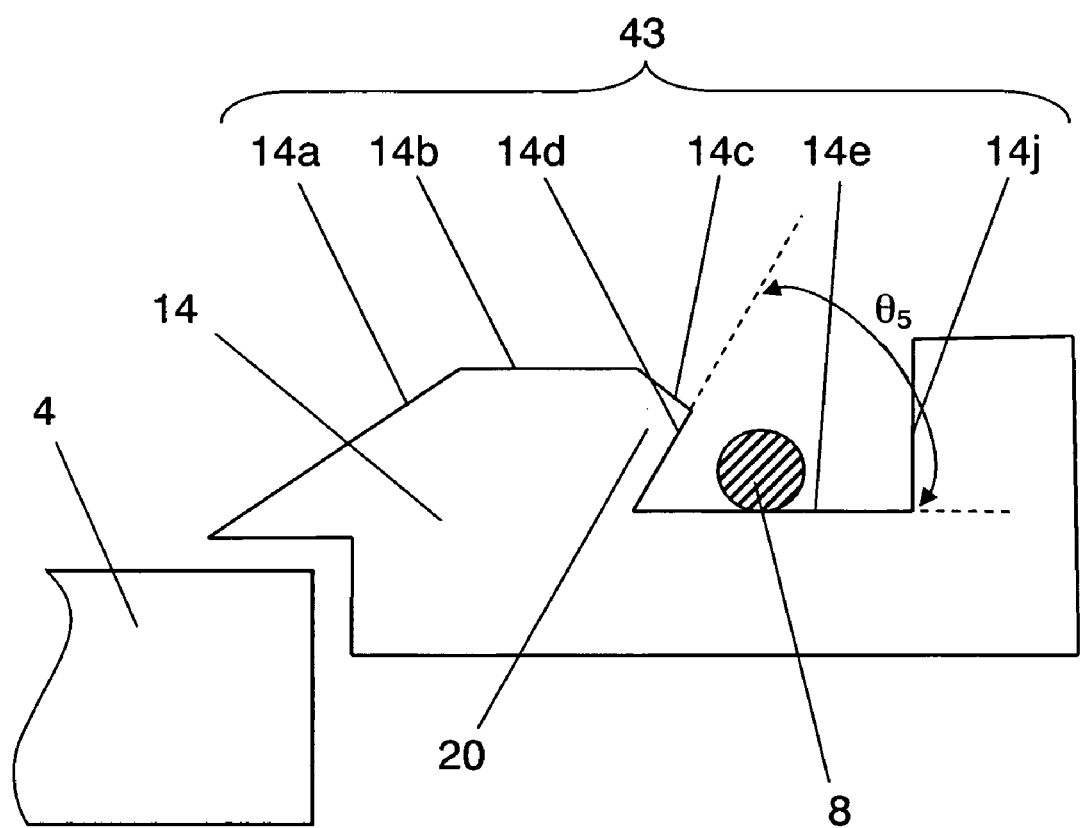
FIG. 16 is a cross-sectional view showing a ramp portion and a recording medium of a magnetic disk device in embodiment 3 of the present invention.
Figure 17:
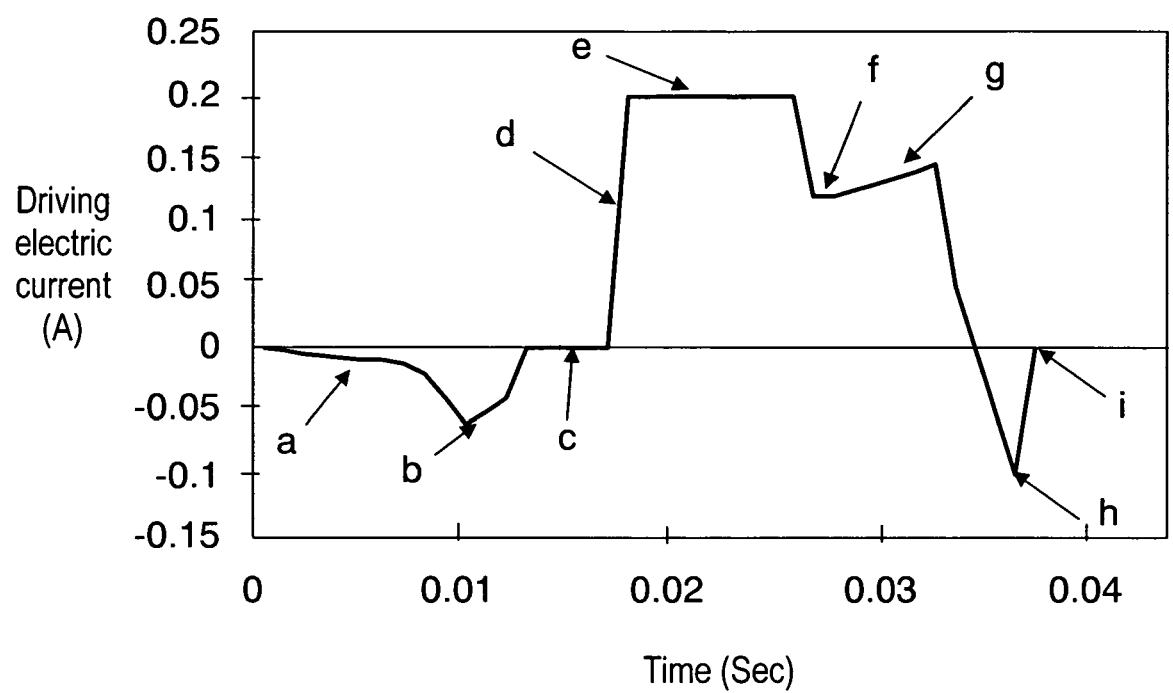
FIG. 17 is a view showing a driving electric current applied to a VCM at a driving time of the disk device in embodiment 3 of the present invention.

A holding method of the actuator with respect to the ramp portion of the disk device in embodiment 3 of the present invention will next be explained. The construction of the actuator arranged in the disk device in embodiment 3 of the present invention is about the same as the construction shown in FIGS. 1 to 4 in embodiment 1, and will be explained with reference to FIGS. 16 and 17 together with these figures. Similar to FIG. 5, FIG. 16 is a cross-sectional view showing the ramp portion and the recording medium of the disk device in embodiment 3 of the present invention. FIG. 17 is a view showing the driving electric current applied to the VCM at the operating time of the disk device in embodiment 3 of the present invention.

In FIGS. 4 and 16, ramp block 15 as the head holding member attached to the chassis or another box body has ramp portion 14 projected in the horizontal direction from the side face of ramp attaching portion 41. One portion of ramp portion 14 is attached such that a clearance is formed between this one portion and the upper side surface of recording medium 4 and this one portion is overlapped with the upper side surface of recording medium 4 in the axial direction of the unillustrated rotation center of recording medium 4.

Ramp portion 14 has a face constructed by first slanting face 14a, first plane 14b, second slanting face 14c, load side wall face 14d, tab portion holding plane 14e and unload side wall face 14j. Tab portion 8a of head support arm 8 constituting the above actuator 7 guides actuator 7 while abutting on upper face 43 of ramp portion 14.

First plane 14b and tab portion holding plane 14e in ramp portion 14 are planes respectively approximately parallel to the plane perpendicular to the rotating axis of actuator 7. Load side wall face 14d adjacent to the loading side of actuator 7 with respect to tab portion holding plane 14e is constructed by a plane having angle $\theta_s$ smaller than 90° with respect to tab portion holding plane 14e, and is formed so as to have a height greater than at least the axial height of the rotating shaft in tab portion 8*a*. In ramp portion 14 arranged in the disk device in embodiment 3 of the present invention, load side projecting portion 20 is formed by second slanting face 14*c* and load side wall face 14*d*.

Linear acceleration and angular acceleration are applied to actuator 7 rotated around the rotating axis by an impact from the exterior applied to the magnetic disk device. At this time, if the direction of impact force due to the linear acceleration applied to the gravity center of actuator 7 and depending on the weight of actuator 7 in its magnitude is the direction of load side wall face 14*d*, this direction has angle $\theta_5$ smaller than 90°. Therefore, no tab portion 8*a* is moved on the disk (recording medium 4) side (load direction side). With respect to the upward impact, one portion of tab portion 8*a* comes in contact with load side wall face 14*d* (i.e., load side projecting portion 20), and is held. Accordingly, it is possible to prevent that actuator 7 is rotated on the side of recording medium 4 with respect to the impact, and head slider 9 is jumped out onto recording medium 4.

The driving operation of actuator 7 in embodiment 3 of the present invention will be explained on the basis of the driving electric current shown in FIG. 17. The load operation is the same as the case of ramp portion 14 arranged in the disk device in embodiment 1 of the present invention, and its explanation is therefore omitted to avoid overlapping. Tab portion 8*a* of actuator 7 is held in tab portion holding plane 14*e* and is in a rest state, and the explanation will be made from a starting time of the load operation.

As shown by a and b in FIG. 17, when a negative electric current is once supplied to the voice coil of the VCM and tab portion 8*a* is rotated in the clockwise direction (tab portion 8*a* is moved rightward on tab portion holding plane 14*e* within FIG. 16), tab portion 8*a* begins to be slipped and the driving electric current becomes a negative maximum correspondingly to an increase in contact load due to friction, but the movement is made by inertia. Accordingly, when the driving electric current is reduced until about 0, tab portion 8*a* is rested without reaching until the position of unload side wall face 14*j* on tab portion holding plane 14*e* (c within FIG. 17).

Thereafter, in the state shown by pulse portion d within FIG. 17, tab portion 8*a* is jumped by reversely supplying a positive pulse electric current. Further, as shown by e in this figure, tab portion 8*a* jumps over load side wall face 14*d* and reaches second slanting face 14*c* by supplying a positive constant driving electric current. Subsequently, the electric current is conducted as shown by f, g, h, i within FIG. 17, and tab portion 8*a* is loaded at a constant speed from first plane 14*b* to the side of recording medium 4 via first slanting face 14*a* by controlling the driving electric current in accordance with the contact load of ramp portion 14 and tab portion 8*a*.

In the disk device in the above embodiment 3 of the present invention, similar to the explanation of embodiment 2, the explanations of voice coil 10 constituting actuator 7, VCM 19 constructed by magnet 11, the pivot bearing portion 29 having the pair of pivots 29*a*, 29*b* constituting the joining portion, etc. are omitted. However, the construction of the disk device in the above embodiment 1 can be approximately similarly adapted.

As explained above, in accordance with embodiment 3 of the present invention, the degree of freedom of design of the actuator is greatly enlarged, and the head support arm constituting the actuator is formed by a material of high rigidity, and the impact resisting property with respect to a large impact from the exterior, etc. is improved. Further, the load with respect to the head slider assembled into the actuator can be increased. A high impact resisting property with respect to a vibration or the impact from the exterior during the operation of the disk device is provided. A resonance frequency of the head support arm can be also raised. Further, the actuator can be rotated and positioned at high speed. Thus, it is possible to realize an excellent actuator having a high access speed. Further, at the stopping time (non-operating time) of the operation of the magnetic disk device, i.e., when the actuator is held in the escaping position, it is possible to prevent the actuator from being moved on the disk side with respect to the large impact from the exterior since the angle formed between the load side wall face and the head holding plane is set to 90° or less. Further, the tab portion can be held on the head holding plane of the ramp portion as the escaping position of the actuator, and high impact resisting performance is provided, and a stable load operation can be performed. Accordingly, it is possible to realize an excellent disk device of the high impact resisting property able to hold the actuator in the escaping position by a simple construction.

Embodiment 4

Figure 18:
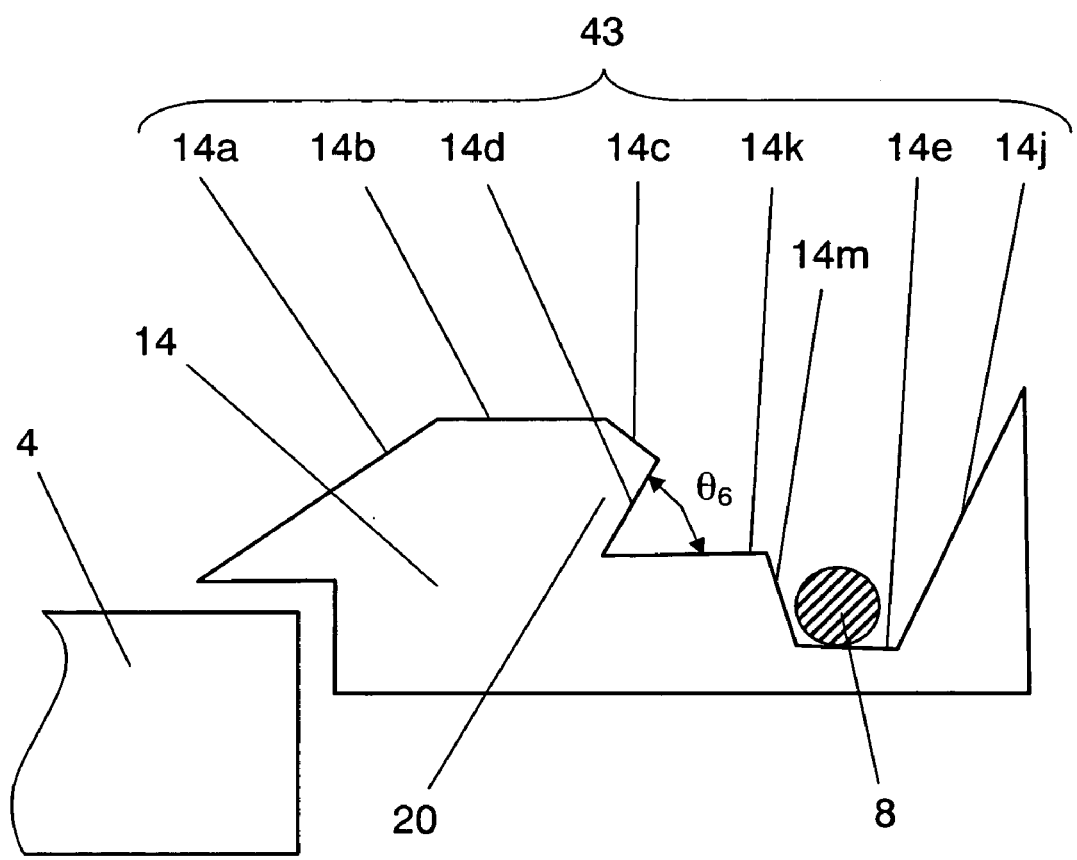
FIG. 18 is a cross-sectional view showing a ramp portion and a recording medium of a disk device in embodiment 4 of the present invention.
Figure 19:
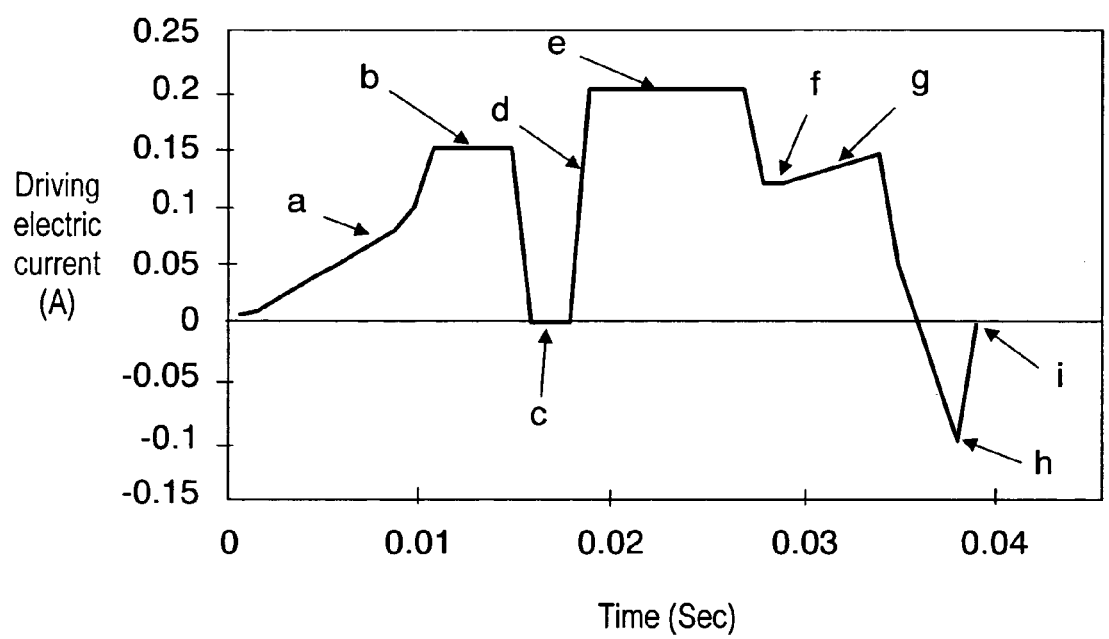
FIG. 19 is a view showing a driving electric current applied to a VCM at a driving time of the disk device in embodiment 4 of the present invention.

A holding method of the actuator with respect to the ramp portion of the disk device in embodiment 4 of the present invention will next be explained. The construction of the actuator arranged in the disk device in embodiment 4 of the present invention is about the same as the construction shown in FIGS. 1 to 4 in embodiment 1, and will be explained together with these FIGS. 1 to 4 with reference to FIGS. 18 and 19. Similar to FIG. 5, FIG. 18 is a cross-sectional view showing the ramp portion and the recording medium of the disk device in embodiment 4 of the present invention. FIG. 19 is a view showing the driving electric current applied to the VCM at the operating time of the disk device in embodiment 4 of the present invention.

In FIGS. 4 and 18, ramp block 15 as the head holding member attached to the chassis or another box body has ramp portion 14 projected in the horizontal direction from the side face of ramp attaching portion 41. One portion of ramp portion 14 is attached such that a clearance is formed between this one portion and the upper side surface of recording medium 4 and this one portion is overlapped with the upper side surface of recording medium 4 in the axial direction of the unillustrated rotation center of recording medium 4.

Ramp portion 14 has upper face 43 constructed by first slanting face 14*a*, first plane 14*b*, second slanting face 14*c*, load side wall face 14*d*, tab portion holding plane 14*e*, unload side wall face 14*j*, second head moving plane 14*k* and head moving slanting face 14*m*. Tab portion 8*a* of head support arm 8 constituting the above actuator 7 guides actuator 7 while abutting on upper face 43 of ramp portion 14.

First plane 14*b*, second head moving plane 14*k* and tab portion holding plane 14*e* in ramp portion 14 are planes respectively approximately parallel to the plane perpendicular to the rotating axis of actuator 7. Load side wall face 14*d* adjacent to the loading side of actuator 7 with respect to second head moving plane 14*k* parallel with tab portion holding plane 14*e* is constructed by a plane having angle $\theta_6$ smaller than 90° with respect to second head moving plane 14*k*, and the height from second head moving plane 14*k* is formed so as to have a height greater than at least the axial height of the rotating shaft in tab portion 8*a*. In the ramp portion arranged in the disk device in embodiment 4 of the present invention, similar to the ramp portion arranged in the disk device in the third embodiment, load side projecting portion 20 is also formed by second slanting face 14*c* and load side wall face 14*d*.

Further, in the disk device in embodiment 4 of the present invention, as mentioned above, linear acceleration and angular acceleration are applied to actuator 7 rotated around the rotating axis by an impact from the exterior. In this case, with respect to the direction of impact force due to the linear acceleration applied to the gravity center of actuator 7 and depending on the weight of actuator 7 in its magnitude, tab portion 8a is once moved to second head moving plane 14k if it is the impact force of the direction of load side wall face 14d. Thereafter, load side wall face 14d has angle $\theta_6$ smaller than 90° with respect to second head moving plane 14k. Therefore, no tab portion 8a is moved on the disk (recording medium 4) side (load direction side). Further, with respect to the upward impact, one portion of tab portion 8a also comes in contact with load side wall face 14d (i.e., load side projecting portion 20) and is held. Accordingly, with respect to the impact, it is possible to prevent that actuator 7 is rotated on the side of recording medium 4, and head slider 9 is jumped out onto recording medium 4.

The driving operation of actuator 7 in embodiment 4 of the present invention will be explained on the basis of the driving electric current shown in FIG. 19. The load operation is the same as the case of the ramp portion arranged in the disk device in embodiment 1 of the present invention. Accordingly, the explanation of this load operation is omitted to avoid overlapping. Tab portion 8a of actuator 7 is held in tab portion holding plane 14e and is in a rest state, and the explanation will be made from a starting time of the load operation.

As shown by a in FIG. 19, when a positive electric current is once supplied to the voice coil of the VCM, and tab portion 8a is rotated in the counterclockwise direction (tab portion 8a is moved leftward on tab portion holding plane 14e in FIG. 18), tab portion 8a begins to be slipped and reaches head moving slanting face 14m. Accordingly, tab portion 8a is slipped and raised along head moving slanting face 14m by further increasing the positive driving electric current (b within FIG. 19). When tab portion 8a reaches second head moving plane 14k, the driving electric current is reduced until about 0, and tab portion 8a is rested on second head moving plane 14k (c within FIG. 19).

Thereafter, tab portion 8a is jumped by again supplying a positive pulse electric current by a pulse portion (the state shown by d within FIG. 19). Further, as shown by e in this figure, tab portion 8a is jumped over load side wall face 14d and reaches second slanting face 14c by supplying a positive constant driving electric current. Subsequently, the electric current is conducted as shown by f, g, h, i within FIG. 19, and tab portion 8a is loaded at a constant speed from first plane 14b to the side of recording medium 4 via first slanting face 14a by controlling the driving electric current in accordance with the contact load of ramp portion 14 and tab portion 8a. Such an operation is the same as the operation in embodiment 1.

In the disk device in the above embodiment 4 of the present invention, the explanations of voice coil 10 constituting actuator 7, VCM 19 constructed by magnet 11, pivot bearing portion 29 having the pair of pivots 29a, 29b as the joining portion, etc. are omitted similarly to the explanations of embodiments 2 and 3. However, the construction of the disk device in the above embodiment 1 can be approximately similarly adapted.

As explained above, in accordance with embodiment 4 of the present invention, the degree of freedom of design of the actuator is greatly enlarged, and the head support arm constituting the actuator is formed by a material of high rigidity, and the impact resisting property with respect to a large impact from the exterior, etc. is improved. Further, the load with respect to the head slider assembled into the actuator can be increased. A high impact resisting property with respect to a vibration or the impact from the exterior during the operation of the disk device is provided. A resonance frequency of the head support arm can be also raised. Further, the actuator can be rotated and positioned at high speed. Thus, it is possible to realize an excellent actuator having a high access speed. Further, at the stopping time (non-operating time) of the operation of the magnetic disk device, i.e., when the actuator is held in the escaping position, it is possible to prevent the actuator from being moved on the disk side with respect to the large impact from the exterior since the angle formed between the load side wall face and the head holding plane is set to 90° or less. Further, the tab portion can be held on the head holding plane of the ramp portion as the escaping position of the actuator, and high impact resisting performance is provided, and a stable load operation can be performed. Accordingly, it is possible to realize an excellent disk device of the high impact resisting property able to hold the actuator in the escaping position by a simple construction.

Figure 20:
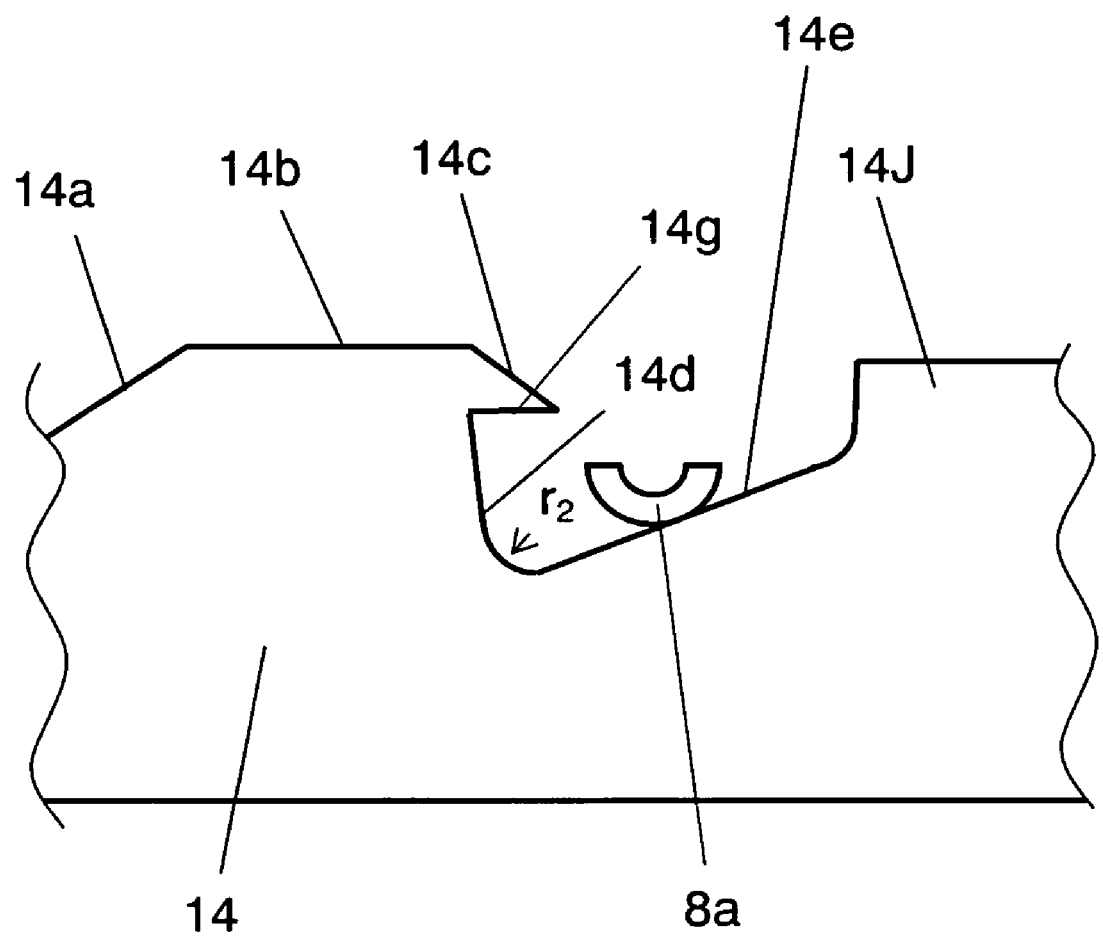
FIG. 20 is a partial enlarged sectional view showing the vicinity of the head holding plane of the ramp portion of a separate construction of the actuator arranged in the magnetic disk device in each of embodiments 1 to 4 of the present invention.

In the above embodiments 1 to 4 of the present invention, tab portion holding plane 14e in ramp portion 14 as a holding device of actuator 7 is not necessarily set to be approximately parallel to the plane perpendicular to the rotating axis of actuator 7. For example, as shown in FIG. 20, tab portion holding plane 14e may be also constructed by a slanting face. In this case, even when the tab is raised on the slanting face with respect to the impact of a direction separated from the disk, the tab can be reliably returned to the holding portion of a slanting face lower portion by restoring force for pushing the ramp in the downward direction by a suspension when the impact is released.

Further, in the explanations of the above embodiments 1 to 4 of the present invention, the magnetic disk device has been explained as an example. However, the present invention is not limited to this example, but may be also applied to a disk recording regenerator of a non-contact type such as a magneto-optic disk device, an optical disk device, etc.

As explained above, when the tab portion of the head support arm is guided by the ramp portion constituting the head holding member by the head holding member of the present invention at an emergency stopping time, and is moved to the head holding plane as the escaping position, the tab portion abuts on the unload side wall face constituting the head holding portion of the ramp portion, and the impact due to the abutting of the ramp portion applied by the tab portion can be restrained so as to be small. Accordingly, it is possible to restrain damage generated in the ramp portion or the tab portion by making the tab portion abut on the ramp portion. Further, when a disturbance such as an impact and a vibration is applied during the stoppage of the operation of the disk device, it is restrained that the head is moved onto the recording medium by the existence of the load side projecting portion projected and formed in the head holding plain upper portion as a load holding portion of the ramp portion. The head support arm can be held, and the head holding member and the disk device having very high impact resisting performance can be realized.

Further, when the tab portion is held on the head holding plane as the escaping position by the head holding method and the disk device of the present invention at the stopping time of the operation of the disk device and a large impact from the exterior is applied, the movement of the tab portion of the head support arm due to the rotation around the rotating axis of the actuator is prevented by the load side projecting portion formed on the recording medium side of the head holding plane of the ramp portion as the escaping position of the actuator. No tab portion is separated from a concave portion formed in the head holding portion of the ramp portion. The tab portion is held on the head holding plane of the ramp portion. It is also possible to prevent the generation of serious breakdowns in which the actuator is moved to the recording medium side and collides with the recording medium so that the surface of the recording medium is damaged, or a part constituting the actuator is damaged. Otherwise, it is possible to prevent the generation of serious breakdowns in which the head slider comes in contact with the recording medium stopped in rotation and adsorbs the recording medium so that the recording medium is damaged in restarting, or no restarting can be performed, etc. On the other hand, at the starting time of the operation of the disk device, the head support arm is rotated in the direction perpendicular to the surface of the recording medium by repulsive driving torque generated between the voice coil and the magnet in the VCM such that the line connecting the respective abutting points of two pivots of the pivot bearing and the upper face of the head support arm is set to a fulcrum. Force for pushing the tab portion upward is applied, and force intended to rotate the actuator around the rotating axis is simultaneously applied. Thus, the load operation is performed such that the actuator is separated from the head holding plane as the escaping position and is moved in the direction on the surface of the recording medium. Then, the recording and regenerating operations of the disk device can be started. Further, when the tab portion of the head support arm is guided by the ramp portion constituting the head holding member at the emergency stopping time of the disk device and is moved to the head holding plane as the escaping position, the impact due to the abutting of the ramp portion received by the tab portion can be restrained so as to be small by making the tab portion abut on the unload side wall face. Thus, it is possible to prevent that fatal damage is caused in the ramp portion or the tab portion by making the tab portion abut on the ramp portion.

Accordingly, when a very large impact from the exterior is applied to the disk device at the stopping time of the operation of the disk device, it is also possible to realize a very stable head holding method of the actuator having a high impact resisting property. Further, in the disk device using such a head holding method, no many individual members are required to hold the actuator and cost is low and a space for holding the head is set to be small. Accordingly, it is possible to realize an excellent disk device suitable for compactness and having a very high impact resisting property.

INDUSTRIAL APPLICABILITY

The head holding member in the present invention uses the head holding member of a simple construction to hold the actuator mounting a signal converting element thereto in the escaping position. Accordingly, the prime cost of manufacture is low and the head holding member has a strong impact resisting property. For example, this head holding member is useful in a magneto-optic disk device, an optical disk device, etc. as a magnetic recording regenerator using a magnetic head, and a disk recording regenerator of a noncontact type.

The invention claimed is:

1. A head holding member for guiding a tab portion formed at one end of a head support arm constituting an actuator to an escaping position, and holding the tab portion in the escaping position when an unloading operation of the actuator is performed by an operation stopping command of a disk device;
wherein the escaping position is formed in the head holding member and comprises:
a head holding plane portion for holding the tab portion;
a load side projecting portion formed on a loading side of the head holding plane portion; and
an unload side wall face formed on a unloading side of the head holding plane portion,
wherein a load side wall face having an angle smaller than 90° with respect to the head holding plane portion is formed on the loading side of the head holding plane portion, and
wherein the load side wall face forms a face opposed to the head holding plane portion of the load side projecting portion.

2. The head holding member of claim 1, wherein the head holding plane portion and the unload side wall face are connected by a curved surface.

3. The head holding member of claim 1, wherein a head moving slanting face having an angle greater than 90° with respect to the head holding plane portion is formed between the head holding plane portion and the load side wall face, and
wherein a head moving plane portion parallel to the head holding plane portion is formed between the head holding plane portion and the load side wall face.

4. The head holding member of claim 1, wherein the head holding plane portion is formed so as to be parallel to a recording face of a recording medium of the disk device, or have an acute angle with respect to the recording face of the recording medium.

5. The head holding member of claim 4, wherein a width of the head holding plane portion is greater than a width of the tab portion of the head support arm in a direction perpendicular to a rotation center of a rotating axis of the actuator.

6. The head holding member of claim 1, wherein a width of the head holding plane portion is greater than a width of the tab portion of the head support arm in a direction perpendicular to a rotation center of a rotating axis of the actuator.

7. A head holding member for guiding a tab portion formed at one end of a head support arm to an escaping position constituting an actuator, and holding the tab portion in the escaping position when an unloading operation of the actuator is performed by an operation stopping command of a disk device;
wherein the escaping position is formed in the head holding member and comprises:
a head holding plane portion for holding the tab portion;
a load side projecting portion formed on a loading side of the head holding plane portion; and
an unload side wall face formed on a unloading side of the head holding plane portion,
wherein a load side wall face having an angle perpendicular to the head holding plane portion is formed on the loading side of the head holding plane portion, and
wherein a head upper wall face extends directly from the load side wall face and forms a face opposed to the head holding plane portion.

8. The head holding member of claim 7, wherein the head holding plane portion and the load side wall face are connected by a curved surface.

9. A head holding member for guiding a tab portion formed at one end of a head support arm to an escaping position constituting an actuator, and holding the tab portion in the escaping position when an unloading operation of the actuator is performed by an operation stopping command of a disk device;
wherein the escaping position is formed in the head holding member and comprises:

a head holding plane portion for holding the tab portion;
a load side projecting portion formed on a loading side of the head holding plane portion; and
an unload side wall face formed on a unloading side of the head holding plane portion,
wherein a slanting face having an angle greater than 90° with respect to the head holding plane is formed between the head holding plane portion and the unload side wall face, and
wherein a head moving plane portion parallel to the head holding plane portion is formed between the head holding plane portion and the unload side wall face.

10. A head holding method in a disk device, the disk device including:
a recording medium rotatably arranged around a primary rotating axis;
a head support arm having a head and a tab portion at one end thereof, the head support arm being capable of rotating around a first rotating axis parallel to the primary rotating axis;
a first bearing portion arranged in a position separated from the primary rotating axis, the first bearing portion allowing rotation of the head support arm;
a second bearing portion arranged between the head and the first bearing portion, the second bearing portion being capable of rotating around a second rotating axis perpendicular to a center line of the longitudinal direction of the head support arm;
two or more abutting portions located on the second rotating axis and abutting on the head support arm or the second bearing portion;
a leaf spring portion for connecting the head support arm and the second bearing portion;
a ramp portion for holding the tab portion at an escaping time of the head support arm;
a head holding plane portion formed in the ramp portion for holding the tab portion in an escaping position;
an unload side wall face formed in the ramp portion, the unload side wall face being formed on an unloading side of the head holding plane portion; and
a load side projecting portion formed in the ramp portion, the load side projecting portion being formed on a loading side of the head holding plane portion for preventing movement of the tab portion from the escaping position to the direction of the recording medium,
the head holding method comprising moving the tab portion to the escaping position to perform an unloading operation of the head support arm upon an operation stopping command of the disk device by:
applying forces in a radial direction of the recording medium and a direction perpendicular to the radial direction and a biasing force of the leaf spring portion to the head support arm;
moving the head support arm in the radial direction of the recording medium; and
abutting the tab portion on the unload side wall face of the ramp portion and then holding the tab portion in the head holding plane portion as the escaping position of the tab portion by at least the biasing force of the leaf spring portion.

11. The head holding method of claim 10, wherein after said moving the tab portion operation, the tab portion is once operated on the unload side and is operated on the load side by a load command of the disk device.

12. The head holding method of claim 10, wherein the head support arm has a voice coil connected to the head support arm through a voice coil holder, and
wherein during said moving the tab portion operation, the head support arm swings around the first rotating axis by supplying an electric current from a power supply to the voice coil and operating the voice coil.

13. The head holding method of claim 12, wherein the waveform of the electric current applied to the voice coil is set to a pulse waveform when the head support arm is operated on the load side.

14. A disk device comprising:
a recording medium rotatably arranged around a primary rotating axis;
a head support arm having a head and a tab portion at one end thereof, the head support arm being capable of rotating around a first rotating axis parallel to the primary rotating axis;
a first bearing portion arranged in a position separated from the primary rotating axis, the first bearing portion allowing rotation of the head support arm;
a second bearing portion arranged between the head and the first bearing portion, the second bearing portion being capable of rotating around a second rotating axis perpendicular to a center line of the longitudinal direction of the head support arm;
two or more abutting portions located on the second rotating axis and abutting on the head support arm or the second bearing portion;
a leaf spring portion for connecting the head support arm and the second bearing portion;
a ramp portion for holding the tab portion at an escaping time of the head support arm;
a head holding plane portion formed in the ramp portion for holding the tab portion in an escaping position;
an unload side wall face formed in the ramp portion, the unload side wall face being formed on an unloading side of the head holding plane portion; and
a load side projecting portion formed in the ramp portion, the load side projecting portion being formed on a loading side of the head holding plane portion for preventing movement of the tab portion from the escaping position to the direction of the recording medium,
wherein the tab portion is movable to the escaping position to perform an unloading operation of the head support arm upon an operation stopping command of the disk device by:
(i) applying forces in a radial direction of the recording medium and a direction perpendicular to the radial direction and a biasing force of the leaf spring portion to the head support arm;
(ii) moving the head support arm in the radial direction of the recording medium; and
(iii) abutting the tab portion on the unload side wall face of the ramp portion and is then held in the head holding plane portion as the escaping position of the tab portion by at least the biasing force of the leaf spring portion, and
wherein a slanting face having an angle greater than 90° with respect to the head holding plane portion, and a head moving plane parallel to the head holding plane portion are formed between the head holding plane portion and the unload side wall face.

15. The disk device of claim 14, wherein the head support arm and the ramp portion are configured such that the tab portion can be moved upward from the escaping position without abutting on an unload side wall face lower portion.

16. The disk device of claim 14, wherein the head holding plane portion and the unload side wall face are connected by a curved surface.

17. The disk device of claim 14, wherein the head holding plane portion is formed so as to be parallel to the recording face of a recording medium of the disk device, or have an acute angle with respect to the recording face.

18. The disk device of claim 17, wherein a width of the head holding plane portion is greater than a width of the tab portion of the head support arm in a direction perpendicular to a rotation center of a rotating axis of the actuator.

19. The disk device of claim 14, wherein the width of the head holding plane portion is greater than the width of the tab portion of the head support arm in a direction perpendicular to the rotation center of a rotating axis of the actuator.

20. The disk device of claim 14, wherein a bearing in the second bearing portion is a pivot bearing with the pivot being an abutting point.

21. The disk device of claim 20, wherein the pivot is formed in a conical shape or a pyramidal shape.

22. The disk device of claim 14, wherein a bearing in the second bearing portion is a pivot bearing with one of an abutting point formed by an abutting curved surface and an abutting line formed of an abutting ridgeline.

23. The disk device of claim 14, wherein the head support arm has a voice coil connected to the head support arm through a voice coil holder, and the head support arm is rotatable around the first rotating axis by supplying an electric current from a power supply to the voice coil and operating the voice coil.

24. The disk device of claim 14, wherein the disk device is configured such that the tab portion of the head support arm is pressed against the head holding plane portion of the ramp portion at a stopping time of the rotation of the recording medium.

25. The disk device of claim 14, wherein the head support arm has a voice coil connected to the head support arm through a voice coil holder, wherein the ramp portion is arranged in the vicinity of the outer circumference of the recording medium, and a first magnet is arranged so as to be opposed to the voice coil on the side opposed to the recording medium side with respect to the head support arm.

26. The disk device of claim 14, wherein the ramp portion is arranged in the vicinity of the rotation center of the recording medium, and a second magnet is arranged so as to be opposed to a second voice coil on the recording medium side with respect to the head support arm.

27. A disk device comprising:

a recording medium rotatable arranged around a primary rotating axis;

a head support arm having a head and a tab portion at one end thereof, the head support arm being capable of rotating around a first rotating axis parallel to the primary rotating axis;

a first bearing portion arranged in a position separated from the primary rotating axis, the first bearing portion allowing rotation of the head support arm;

a second bearing portion arranged between the head and the first bearing portion, the second bearing portion being capable of rotating around a second rotating axis perpendicular to a center line of the longitudinal direction of the head support arm;

two or more abutting portions located on the second rotating axis and abutting on the head support arm or the second bearing portion;

a leaf spring portion for connecting the head support arm and the second bearing portion;

a ramp portion for holding the tab portion at an escaping time of the head support arm;

a head holding plane portion formed in the ramp portion for holding the tab portion in an escaping position;

an unload side wall face formed in the ramp portion, the unload side wall face being formed on an unloading side of the head holding plane portion; and a load side projecting portion formed in the ramp portion, the load side projecting portion being formed on a loading side of the head holding plane portion for preventing movement of the tab portion from the escaping position to the direction of the recording medium, wherein the tab portion is movable to the escaping position to perform an unloading operation of the head support arm upon an operation stopping command of the disk device by:

(i) applying forces in a radial direction of the recording medium and a direction perpendicular to the radial direction and a biasing force of the leaf spring portion to the head support arm;

(ii) moving the head support arm in the radial direction of the recording medium; and (iii) abutting the tab portion on the unload side wall face of the ramp portion and is then held in the head holding plane portion as the escaping position of the tab portion by at least the biasing force of the leaf spring portion, wherein a load side wall face having an angle perpendicular to the head holding plane portion is formed on the loading side of the head holding plane portion, and wherein a head upper wall face extends directly from the load side wall face and forms a face opposed to the head holding plane portion.

28. The disk device of claim 27, wherein the head holding plane portion and the load side wall face are connected by a curved surface.

29. A disk device comprising:

a recording medium rotatably arranged around a primary rotating axis;

a head support arm having a head and a tab portion at one end thereof, the head support arm being capable of rotating around a first rotating axis parallel to the primary rotating axis;

a first bearing portion arranged in a position separated from the primary rotating axis, the first bearing portion allowing rotation of the head support arm;

a second bearing portion arranged between the head and the first bearing portion, the second bearing portion being capable of rotating around a second rotating axis perpendicular to a center line of the longitudinal direction of the head support arm;

two or more abutting portions located on the second rotating axis and abutting on the head support arm or the second bearing portion;

a leaf spring portion for connecting the head support arm and the second bearing portion;

a ramp portion for holding the tab portion at an escaping time of the head support arm;

a head holding plane portion formed in the ramp portion for holding the tab portion in an escaping position;

an unload side wall face formed in the ramp portion, the unload side wall face being formed on an unloading side of the head holding plane portion; and a load side projecting portion formed in the ramp portion, the load side projecting portion being formed on a loading side of the head holding plane portion for preventing movement of the tab portion from the escaping position to the direction of the recording medium, wherein the tab portion is movable to the escaping position to perform an unloading operation of the head support arm upon an operation stopping command of the disk device by:
(i) applying forces in a radial direction of the recording medium and a direction perpendicular to the radial direction and a biasing force of the leaf spring portion to the head support arm;
(ii) moving the head support arm in the radial direction of the recording medium; and
(iii) abutting the tab portion on the unload side wall face of the ramp portion and is then held in the head holding plane portion as the escaping position of the tab portion by at least the biasing force of the leaf spring portion,
wherein a load side wall face having an angle smaller than 90° with respect to the head holding plane portion is formed on the loading side of the head holding plane portion, and
wherein the load side wall face forms a face opposed to the head holding plane portion of the load side projecting portion.

30. A disk device comprising:
a recording medium rotatably arranged around a primary rotating axis;
a head support arm having a head and a tab portion at one end thereof, the head support arm being capable of rotating around a first rotating axis parallel to the primary rotating axis;
a first bearing portion arranged in a position separated from the primary rotating axis, the first bearing portion allowing rotation of the head support arm;
a second bearing portion arranged between the head and the first bearing portion, the second bearing portion being capable of rotating around a second rotating axis perpendicular to a center line of the longitudinal direction of the head support arm;
two or more abutting portions located on the second rotating axis and abutting on the head support arm or the second bearing portion;
a leaf spring portion for connecting the head support arm and the second bearing portion;
a ramp portion for holding the tab portion at an escaping time of the head support arm;
a head holding plane portion formed in the ramp portion for holding the tab portion in an escaping position;
an unload side wall face formed in the ramp portion, the unload side wall face being formed on an unloading side of the head holding plane portion; and
a load side projecting portion formed in the ramp portion, the load side projecting portion being formed on a loading side of the head holding plane portion for preventing movement of the tab portion from the escaping position to the direction of the recording medium,
wherein the tab portion is movable to the escaping position to perform an unloading operation of the head support arm upon an operation stopping command of the disk device by:
(i) applying forces in a radial direction of the recording medium and a direction perpendicular to the radial direction and a biasing force of the leaf spring portion to the head support arm;
(ii) moving the head support arm in the radial direction of the recording medium; and
(iii) abutting the tab portion on the unload side wall face of the ramp portion and is then held in the head holding plane portion as the escaping position of the tab portion by at least the biasing force of the leaf spring portion,
wherein the head holding plane portion and the load side wall face are connected by a curved surface, and
wherein a head moving slanting face having an angle greater than 90° with respect to the head holding plane portion, and a head moving plane parallel to the head holding plane portion are formed between the head holding plane portion and the load side wall face.

31. A disk device comprising:
a recording medium rotatable arranged around a primary rotating axis;
a head support arm having a head and a tab portion at one end thereof, the head support arm being capable of rotating around a first rotating axis parallel to the primary rotating axis;
a voice coil connected to the head support arm;
a first bearing portion arranged in a position separated from the primary rotating axis, the first bearing portion allowing rotation of the head support arm;
a second bearing portion arranged between the head and the first bearing portion, the second bearing portion being capable of rotating around a second rotating axis perpendicular to a center line of the longitudinal direction of the head support arm;
two or more abutting portions located on the second rotating axis and abutting on the head support arm or the second bearing portion;
a leaf spring portion for connecting the head support arm and the second bearing portion;
a ramp portion for holding the tab portion at an escaping time of the head support arm;
a head holding plane portion formed in the ramp portion for holding the tab portion in an escaping position;
an unload side wall face formed in the ramp portion, the unload side wall face being formed on an unloading side of the head holding plane portion; and
a load side projecting portion formed in the ramp portion, the load side projecting portion being formed on a loading side of the head holding plane portion for preventing movement of the tab portion from the escaping position to the direction of the recording medium,
wherein the tab portion is movable to the escaping position to perform an unloading operation of the head support arm upon an operation stopping command of the disk device by:
(i) applying forces in a radial direction of the recording medium and a direction perpendicular to the radial direction and a biasing force of the leaf spring portion to the head support arm;
(ii) moving the head support arm in the radial direction of the recording medium; and
(iii) abutting the tab portion on the unload side wall face of the ramp portion and is then held in the head holding plane portion as the escaping position of the tab portion by at least the biasing force of the leaf spring portion, and
wherein a waveform of a driving electric current applied to the voice coil is set to a pulse waveform when the head support arm is operated on the load side.

* * * * *

UNITED STATES PATENT AND TRADEMARK OFFICE
CERTIFICATE OF CORRECTION

PATENT NO. : 7,733,608 B2
APPLICATION NO. : 10/575456
DATED : June 8, 2010
INVENTOR(S) : Yoshihiro Ueno et al.

It is certified that error appears in the above-identified patent and that said Letters Patent is hereby corrected as shown below:

In the Claims

In column 42, claim 31, (original claim 24), line 13, "rotatable" should read --rotatably--.

Signed and Sealed this

Seventeenth Day of August, 2010

David J. Kappos
*Director of the United States Patent and Trademark Office*